(12) United States Patent
Webb

(10) Patent No.: US 6,675,177 B1
(45) Date of Patent: Jan. 6, 2004

(54) METHOD AND SYSTEM FOR BACKING UP DIGITAL DATA

(75) Inventor: Kristen J. Webb, Swissvale, PA (US)

(73) Assignee: Teradactyl, LLC, Swissvale, PA (US)

(*) Notice: Subject to any disclaimer, the term of this patent is extended or adjusted under 35 U.S.C. 154(b) by 185 days.

(21) Appl. No.: 09/886,509

(22) Filed: Jun. 21, 2001

Related U.S. Application Data

(60) Provisional application No. 60/212,947, filed on Jun. 21, 2000.

(51) Int. Cl.[7] .................................................. G06F 17/00
(52) U.S. Cl. ........................... 707/200; 707/203; 711/1
(58) Field of Search .............. 707/1–206; 709/200–203, 709/217–229; 711/1–6

(56) References Cited

U.S. PATENT DOCUMENTS

| | | | |
|---|---|---|---|
| 3,588,839 A | | 6/1971 | Belady et al. |
| 4,916,605 A | | 4/1990 | Beardsley et al. |
| 5,715,424 A | | 2/1998 | Jesionowski et al. |
| 5,751,997 A | | 5/1998 | Kullick et al. |
| 5,829,046 A | | 10/1998 | Tzelnic et al. |
| 5,953,729 A | | 9/1999 | Cabrera et al. |
| 6,526,418 B1 | * | 2/2003 | Midgley et al. ............ 707/204 |
| 6,526,434 B1 | * | 2/2003 | Carlson et al. ............. 709/203 |
| 6,564,215 B1 | * | 5/2003 | Hsiao et al. .................... 707/8 |

OTHER PUBLICATIONS

Eitel, Backup and storage management in distributed heterogeneous environments, Mass Storage Systems, 1994, Towards Distributed Storage and Data Management Systems, First International Symposium, Proceedings, Thirteenth IEEE Symposium on, Jun. 12–16, 1994.*

Armstead et al., Implementation of a campus–wide distributed mass storage service: the dream vs. reality, Mass Storage Systems, 1995, Storage—At the Forefront of Information Infrastructures, Proceedings of the Fourteenth IEEE Symposium on, 11–14 Sep.*

Arneson, Mass storage archiving in network environmnets, Mass Storage Systems, 1988, Storage Systems: Perspectives, Digest of Papers, Ninth IEEE Symposium on, Oct. 31–Nov. 3, 1998, pp. 45–50.*

Teradactyl, LLC, Terabck TM Version 2.0, User Manual "The Sclable Network Backup System", pp. 1–97 (1997–2000).

* cited by examiner

Primary Examiner—David Jung
(74) Attorney, Agent, or Firm—William F. Lang, IV; Eckert Seamans Cherin & Mellott, LLC

(57) ABSTRACT

An improved backup system for computer networks provides simplified operation, reduced utilization of computer system resources, and increased recovery potential in the events of information loss. At each backup time interval, the computer system sends all files created or modified since the time stamp to the backup system. The file stream flowing from the computer system to the backup system contains metadata at the boundaries of each file. Once all files are received from the computer system, the backup system produces a new full backup tape by merging the present backup tape with the newly received files, replacing each file on the presently existing tape that was modified with the newer version of that file. The resulting backup tape contains substantially the same set of files that would result from a full backup, or, if desired, a higher level backup.

20 Claims, 23 Drawing Sheets

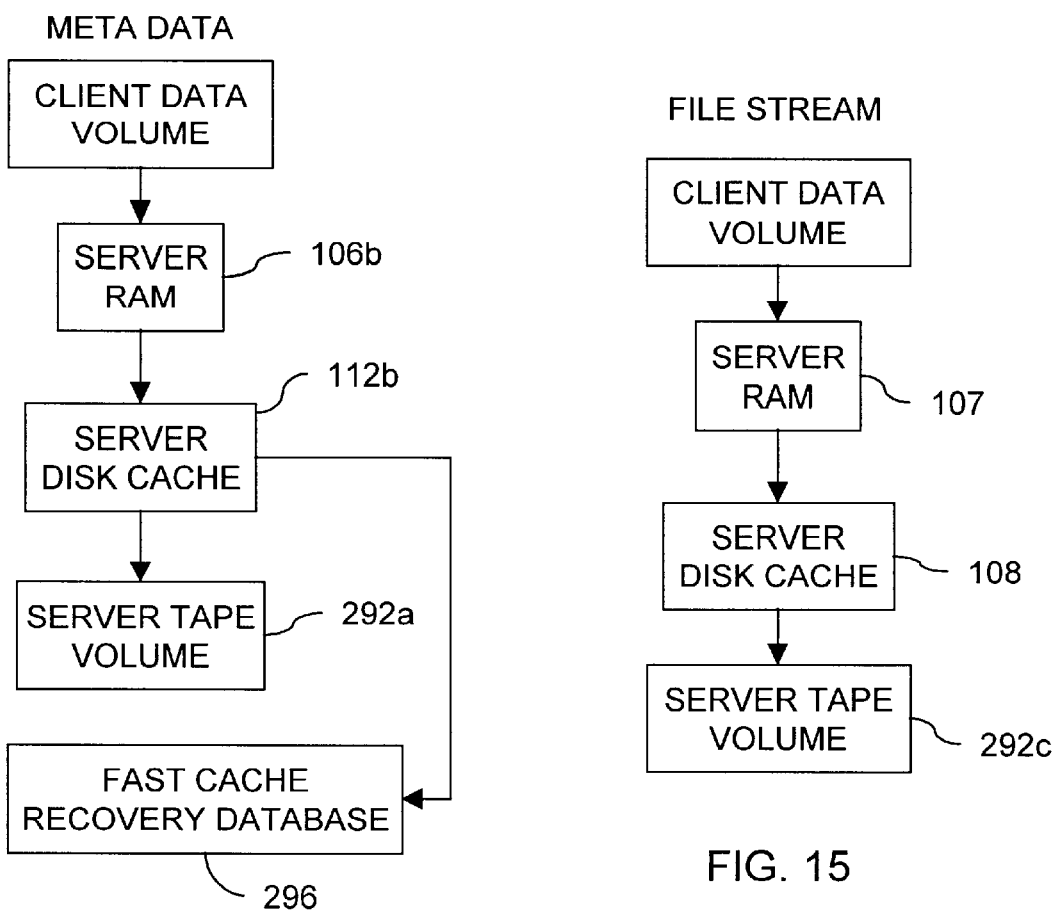
FIG. 14
FIG. 15
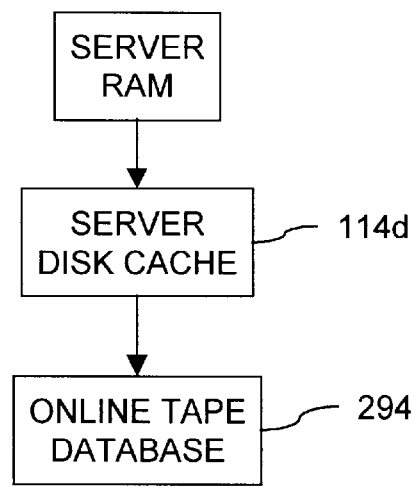
FIG. 16

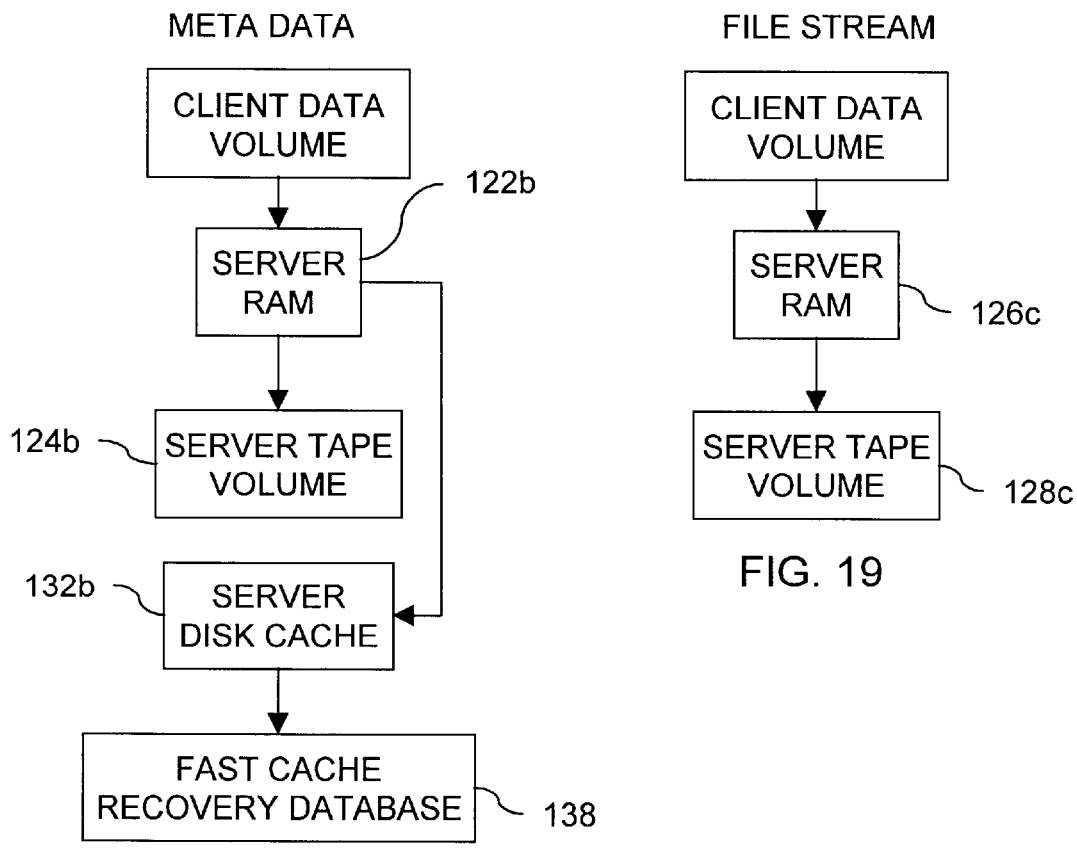
FIG. 18
FIG. 19
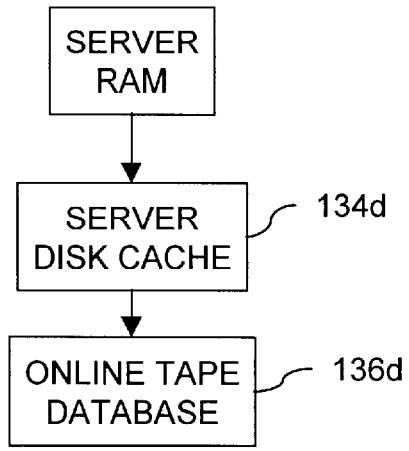
FIG. 20

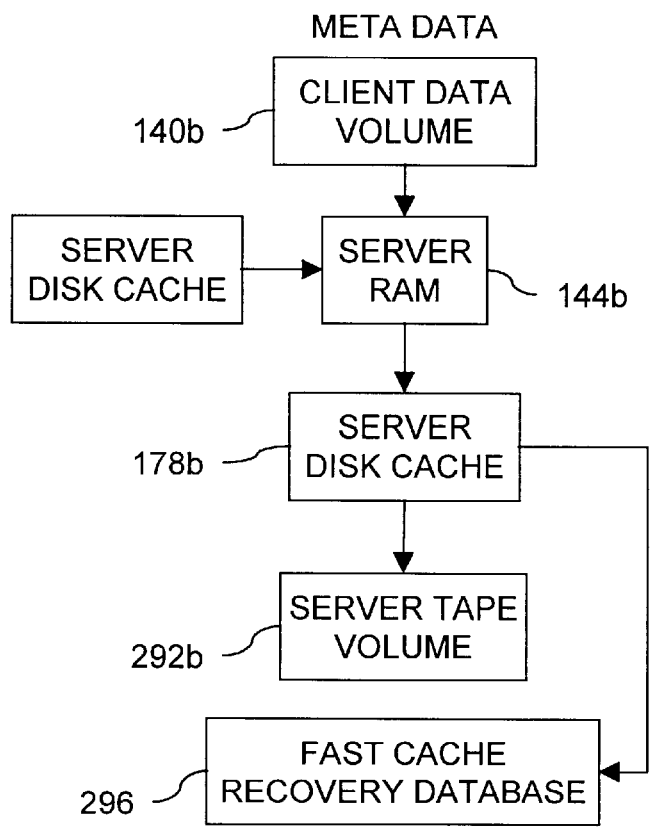
FIG. 22
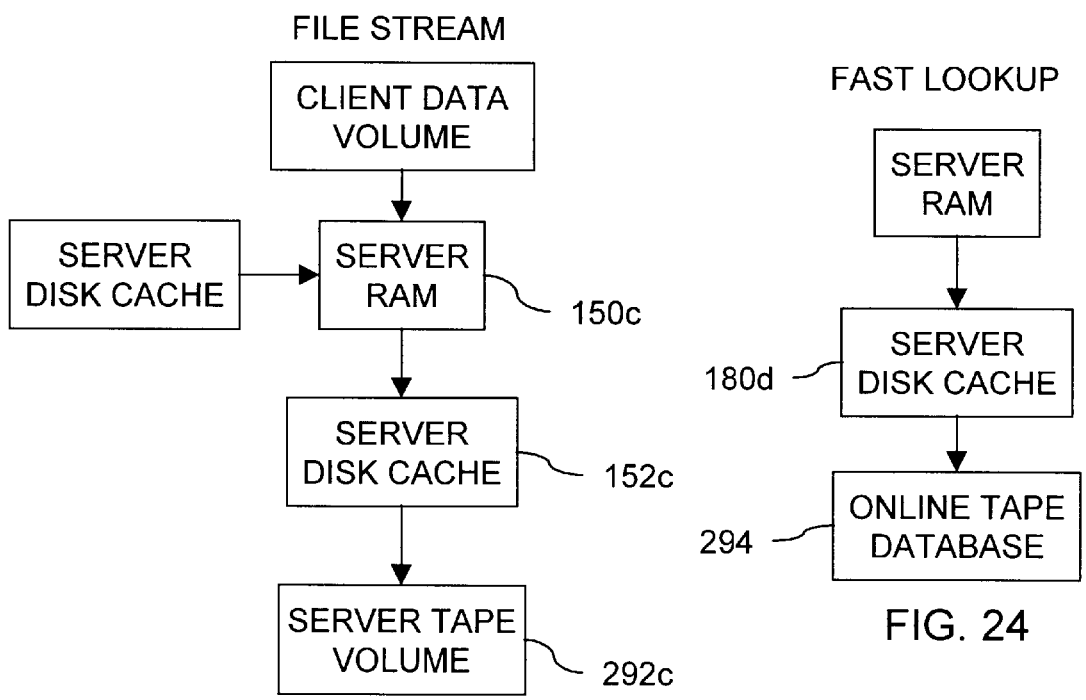
FIG. 23
FIG. 24

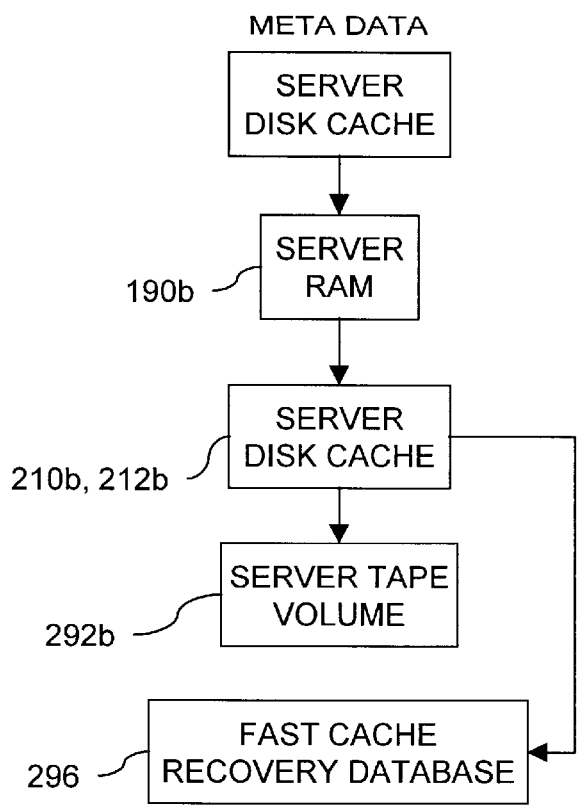
FIG. 30
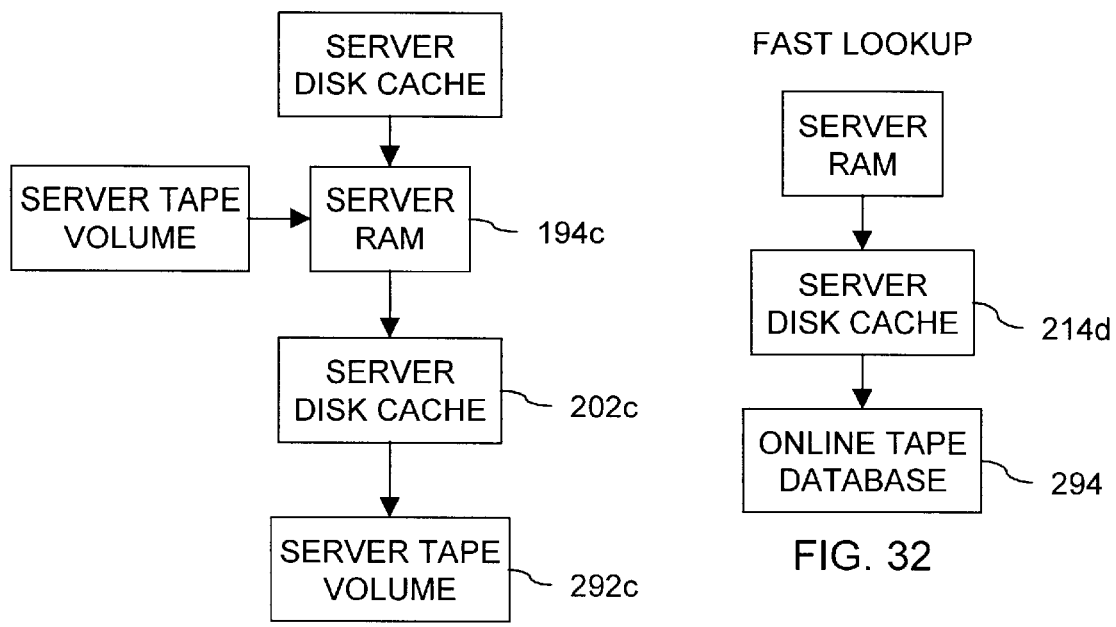
FIG. 31
FIG. 32

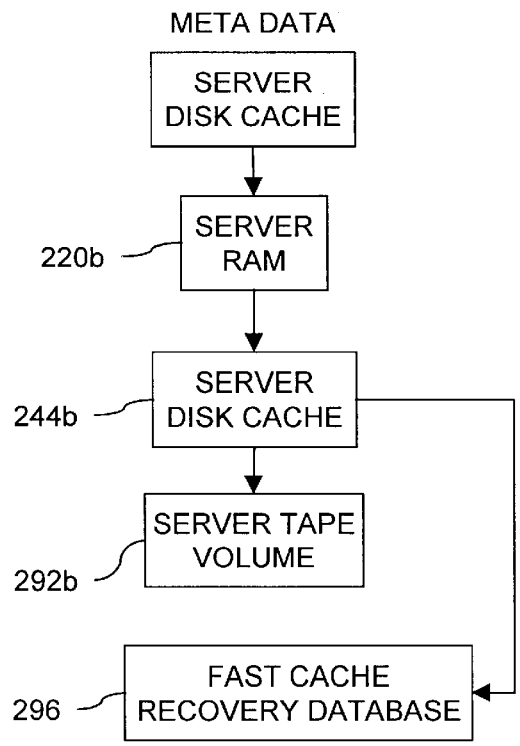
FIG. 34
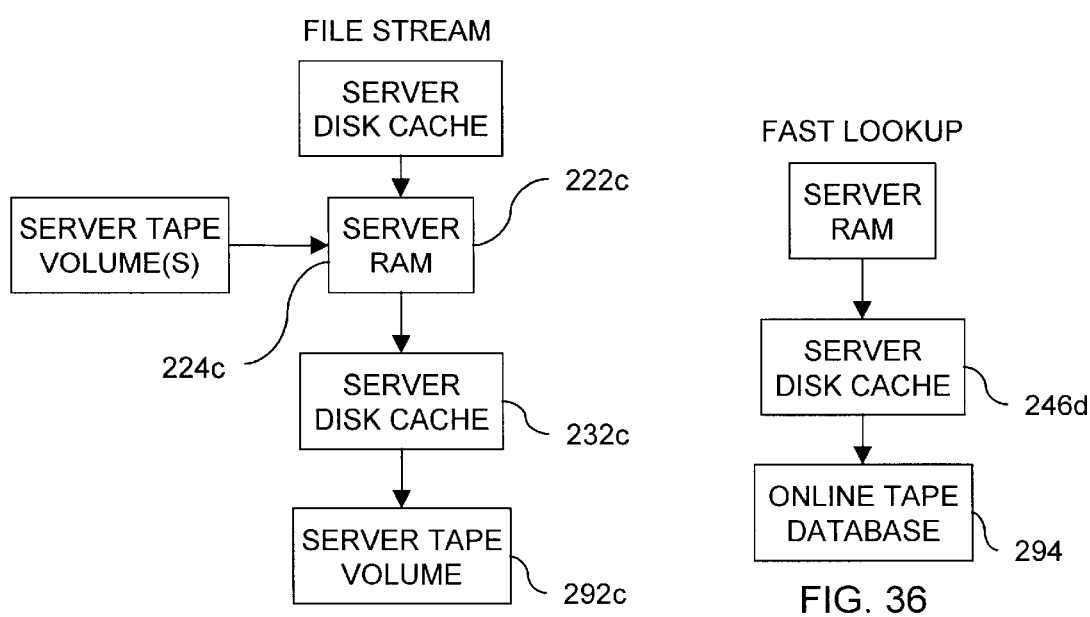
FIG. 35
FIG. 36

METHOD AND SYSTEM FOR BACKING UP DIGITAL DATA

CROSS REFERENCE TO RELATED APPLICATIONS

This application claims the benefit of U.S. Provisional Patent Application No. 60/212,947, filed Jun. 21, 2000.

BACKGROUND OF THE INVENTION

1. Field of the Invention

The present invention relates to backup systems for computers. More specifically, the invention is an improved backup system minimizing resource utilization within the computer system, and maximizing recovery potential in the event of information losses.

2. Description of the Related Art

Recently, there have been technological advances in the capacity of data storage devices, such as hard drives, that enable data servers, network workstations, and roaming clients to carry increased amounts of information. Due to these advances, the once relatively simple process of keeping computer data backed up using relatively low cost, removable media has become more complex. An important task of conventional information technology professionals is to manage new backup function requirements in next generation network designs without significant disruption to network users.

Most traditional level backup methods and systems attempt to offer a degree of flexibility in scheduling backup operations to assist the information technology professional in reducing the disruptive effect of various aspects of these backup operations. These conventional products, however, typically provide an increased exposure to the information system in the form of data loss due to failure of a single storage device, such as a tape failure.

Most conventional backup products use what is known as a "traditional level backup". The levels of backup are typically defined from zero to nine (0–9). For example, a "Level 0" backup is defined as the "epoch" or full backup; all data contained on a client information system is backed up during a Level 0 backup. Higher level backups operate on the principle that all data changes are backed up since the most recent backup of any lower and/or preceding level. For example, a Level 2 backup obtains and stores data that has been changed or created since the most recent of either the Level 0 or Level 1 backup.

In a typical traditional level scheme, there is a tradeoff between stress on the network and client systems and exposure to storage device failure prior to or during a future restore process. More complex schedules can offer a significantly reduced network load, for example, but can also require more tape read requests to restore data completely. The need for more tapes in the restore process therefore increases the exposure to storage device failure. In a level backup scheme, for the purpose of future restore operations a single bad tape can lead to a substantial amount of lost data. On the other hand, employing fewer backup levels can improve restore time and reliability, but cost is increased in the form of downtime for networks and backup clients during backup operations.

Many conventional backup systems and methods utilize a 2 or 3 level backup scheme. This appears to be a level range where information technology professionals are comfortable with the above-described limitations of a traditional level backup. Level 0 backups are usually run an a weekly, bi-weekly, or monthly schedule, depending on factors such as the amount of data, the available network bandwidth, and the risk associated with potential loss of data. Systems and methods that place a comparatively higher value on data tend to perform a two level backup scheme. Systems and methods that are limited by any combination of factors such as the amount of data, the data change rate, the available backup window, or the rate that backup data can be transferred over the available network bandwidth, tend to use a three level or higher backup scheme.

In an attempt to resolve the inadequacies of a traditional level backup, several conventional systems and methods have evolved:

In a day-to-day backup system, only the data changes that have occurred since the most recent backup are taken from the backup client and written to a storage device. This has the benefit of reducing stress on the backup client system, but the number of storage devices that must be read to restore a data partition can increase dramatically over time. Periodic full backups through the network are required to maintain a reasonably low number of storage devices. In addition, a backup server in this type of system must be able to determine efficiently and exactly what tapes to read and what data to send to the backup client. If an efficient and exact system is not available, an additional burden is placed on the backup client during the restore process, because many copies of the same file may need to be transferred.

Some systems and methods attempt, on a day-to-day basis, to collocate related backup volumes on a single storage device. This approach reduces the tape complexity for restore operations, but it also increases the exposure if a single storage device, such as a single tape, fails. A substantial risk associated with these types of systems and methods is that many days worth of backup data can be irretrievably lost.

One way to reduce the risk of data loss due to storage device failure is to create a copy of all original data storage devices. This may be known as tape mirroring. Many conventional backup systems and methods provide information technology professionals with the ability to replicate data easily, but storage device costs are doubled if the data is fully duplicated. Network and backup client loads in this model remain dictated by the level backup scheme that is chosen.

A method and system are therefore needed to manage backup operations and to minimize the adverse impact of these backup operations on data networks, backup clients and/or other network users. What is further needed are a method and system that can reduce the risk of data loss due to storage device failure. A flexibility of design is required that permits an information technology professional to re-define a backup plan, achieve a higher level of reliability with backup operations, and possibly reduce the cost of storage devices, such as tapes.

SUMMARY OF THE INVENTION

The present invention is an improved backup system, maximizing the ability to recover data in the event of information loss, while minimizing utilization of computer system resources.

The backup system begins by sending a time stamp of zero to the computer system. At time zero, all files, directories, and meta information presently existing on the computer system are transferred to the backup system. Additionally, the client computer system sends the present time to the backup server, which becomes the parent time for the next successive backup operation. At the next backup time interval, the time stamp representing the previous backup is sent from the backup system to the computer system, prompting the computer system to send all files that have been modified since the last backup to the backup system. All metadata within the computer system is also sent. If any file is unable to be sent, for example, a file that has been opened by a user, the identity of that file is also sent to the backup server. The computer system sends the files to the backup server in a file stream comprising a sequence of files with metadata headers and footers defining the identity and boundaries of each file. With unique identifiers for every file within the file stream, the files may be transmitted in any order, and a separate file containing the location of files within the data stream is not required. This file stream is directed towards the cache of the backup system.

Once all transmitted files are within the cache, the backup system checks the transmitted metadata and its records of the previous backup to determine whether there are any files that should have been backed up with the previous backup, but were not sent with the previous backup information, and looks for these files in the cache. If any such files are not within the cache, the backup system requests these files from the computer system. Once these files are received, the backup system now has everything needed to produce a full backup volume.

Once all files modified since the last backup are in the cache, the backup server will sequentially scan the presently existing backup tapes in reverse chronological order until the most recent full backup tape is reached and itself scanned. As each backup tape is being scanned, the file stream from that tape is compared with the files currently in the cache. If the file on tape is an earlier version of a later file in the cache (indicating that the file was updated), or the file on tape is not represented in the present metafile (indicating that the file was deleted), the file on tape is skipped. Otherwise, the file is copied into the cache. Once all tapes have been scanned, the metadata and the previous full backup are checked to ensure that all files are complete. If so, the cache is copied onto a new tape, resulting in a full backup tape. If any files are found not to be complete, the backup system will require a full backup, sending a request to the computer system to transmit all files to the backup system.

In the event of damage to the new full backup tape, the tapes within the backup system used to produce this new tape still exist within the backup system, and can be used to recover the information lost from the new backup tape.

Accordingly, it is an aspect of the present invention to provide a backup system for computer systems wherein the majority of backup operations are performed within the backup server instead of within the computer system.

It is another aspect of the present invention to provide a backup system for computers minimizing the need for full network backups, wherein all files are transmitted from the computer system to the backup system.

It is a further aspect of the present invention to provide a backup system for computers wherein files modified since the last full backup are merged with the files presently existing in the backup system to produce a new full backup tape, or, if desired, one or more mid-level backups at levels desirable to a particular client, without placing the demands on the client's resources normally required for the desired backup levels.

It is another aspect of the present invention to provide a backup system for computers wherein the file stream transmitted from the computer system to the backup system contains metadata headers and footers for each file transmitted, thereby providing unique identifiers within the file stream for each file, and thereby permitting transmittal of all files in any order, and eliminating the need for a separate file containing the location of files transmitted within the file stream.

It is a further aspect of the present invention to provide a backup system having redundancy to the last backup taken, for all backups except the first full backup, thereby maximizing recovery potential in the event of problems within the backup system.

These and other aspects of the present invention will become apparent through the following description and drawings.

BRIEF DESCRIPTION OF THE DRAWINGS

FIG. 14 is a flow chart illustrating the path of the metadata during a full network backup according to the present invention.

FIG. 15 is a flow chart illustrating the path of the file stream during a full network backup according to the present invention.

FIG. 16 is a flow chart illustrating the path of the fast look-up file during a full network backup according to the present invention.

FIG. 18 is a flow chart illustrating the path of the metadata during a full network direct tape backup according to the present invention.

FIG. 19 is a flow chart illustrating the path of the file stream during a full network direct tape backup according to the present invention.

FIG. 20 is a flow chart illustrating the path of the fast look-up file during a full network direct tape backup according to the present invention.

FIG. 22 is a flow chart illustrating the path of the metadata during an incremental network merge backup according to the present invention.

FIG. 23 is a flow chart illustrating the path of the file stream during an incremental network merge backup according to the present invention.

FIG. 24 is a flow chart illustrating the path of the fast look-up file during an incremental network merge backup according to the present invention.

FIG. 30 is a flow chart illustrating the path of the metadata during a flush merge backup according to the present invention.

FIG. 31 is a flow chart illustrating the path of the file stream during a flush merge backup according to the present invention.

FIGS. 32A to 32B are a flow chart illustrating the path of the fast look-up file during a flush merge backup according to the present invention.

FIG. 34 is a flow chart illustrating the path of the metadata during a full merge backup according to the present invention.

FIG. 35 is a flow chart illustrating the path of the file stream during a full merge backup according to the present invention.

FIG. 36 is a flow chart illustrating the path of the fast look-up file during a full merge backup according to the present invention.

Like reference numbers denote like elements throughout the drawings.

DETAILED DESCRIPTION

The present invention is an improved back-up system, maximizing the ability to recover data in the event of information loss, while minimizing utilization of computer system resources.

Figure 5:
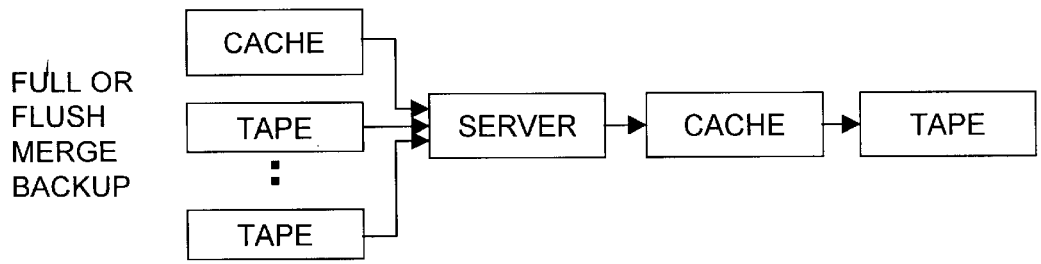
FIG. 5 is a flow chart illustrating the basic steps of a full or flush merge backup according to the present invention.
Figure 6:
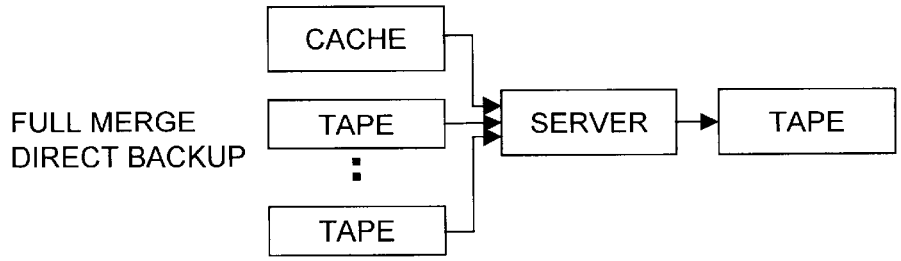
FIG. 6 is a flow chart illustrating the basic steps of a full merge direct backup according to the present invention.

In one embodiment of the present invention, a data merging method is performed that leverages the benefits of an incremental backup server. This aspect of the invention is practiced in at least three different ways. First, referring to FIG. 3, new incremental backup volumes can be created, by merging the most recent changes from backup clients with cumulative incremental data from the backup cache. Second, referring to FIG. 5, cumulative incremental data from the backup cache may be merged with previous cumulative incremental data stored on tape to produce a new cumulative incremental tape volume known as a flush volume. Finally, referring to FIGS. 5 and 6, new full backup volumes can be created, by merging the last full backup volume with the cumulative incremental backup data from the backup cache and possibly other incremental or flush tape volumes. The resulting full backup volume is substantially identical to one that would have been taken from the client at the same point in time by performing a traditional level 0 backup.

Figure 3:
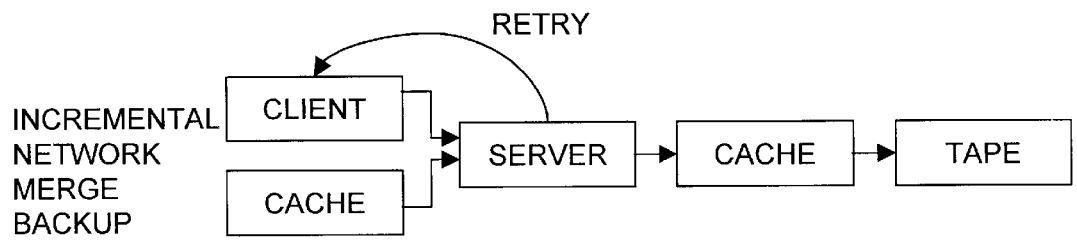
FIG. 3 is a flow chart illustrating the basic steps of an incremental network merge backup according to the present invention.
Figure 4:
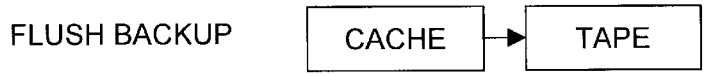
FIG. 4 is a flow chart illustrating the basic steps of a flush backup according to the present invention.

In the present invention, all merging processes occur on the backup server. Backup clients are responsible for sending the latest changes during incremental backups. An important advantage of the present invention is that the backup server reuses those files that would normally be re-sent by the backup client in a traditional level backup. Another important aspect of the present invention is the backup server's ability to maintain an updated copy of all files on a backup client by using a single pass client algorithm (e.g. each file or directory is inspected only once), and a subsequent retry phase, in which the backup server verifies that all files have been backed up correctly and requests individual client files as illustrated in FIG. 3. In a typical example, the UNIX dump algorithm may perform four or more passes to determine which files should be backed up.

Within the following description, four flow charts are frequently used to illustrate a single process, with one flow chart illustrating the entire process, a second flow chart illustrating the path followed by the meta data, a third flow chart illustrating the path followed by the file stream, and a fourth flow chart illustrating the path filed by the fast look-up file. Within these four flow charts, a single reference character will be used to denote all identical process steps within all flow charts, and the reference number followed by a letter will be used to donate the process step within an individual flow chart. Therefore, the reference number followed by an A will denote the overall process, the reference number followed by a B will denote the process followed by the meta data, the reference number followed by a C will denote the process followed by the file stream, and the reference number followed by a D will denote the process followed by the fast look-up file.

Figure 1:
FIG. 1 is a flow chart illustrating the basic steps of a full network backup according to the present invention.
Figure 2:
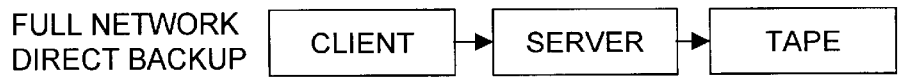
FIG. 2 is a flow chart illustrating the basic steps of a full network direct backup according to the present invention.

In one aspect of the present invention, referring to FIG. 1, if the backup server does not have a cache meta file, for example, the first time a backup is performed for this backup client, a time stamp of 0 is sent to the backup client. The client sends information to the server using a single pass algorithm at FIGS. 1 and 13–16, step 104 that sends meta data for each directory and meta and file stream data for each file on the client volume. A meta file is a file that contains a meta header and a meta entry for each file or directory that exists on a client's computer system at this backup time. A meta entry is an entry containing all of the information backed up for a file except for the actual file data. A file stream is a file or group of files that contains a series of file stream entries and ends in a special end of stream entry. A file stream entry is a single entry in a file stream that is made up of a header, file data, and a footer. After checking to see if the client's scan is complete at step 105, the server stores the meta data for the current object in RAM at step 106. The client directs all file data 56 and file stream footer 58,60 data for the current file to the server at step 107 and the server then directs it to the cache at step 108. When the client finishes scanning all files and directories, it sends and end-of-stream marker to the backup server. Once the end-of-stream marker is received by the server the client connection is closed and the server writes writes an end of stream marker to the new cache file stream at step 110, marks the RAM meta file header for flush, copies this time 16 to the parent time 18, and writes the RAM meta file to a new cache meta file at step 112, writes new fast look-up file to the cache at step 114, and removes the old cache meta file, file stream, and fast look-up file, and makes the new cache meta file, file stream and fast look-up file the current ones at steps 116.

Figure 7:
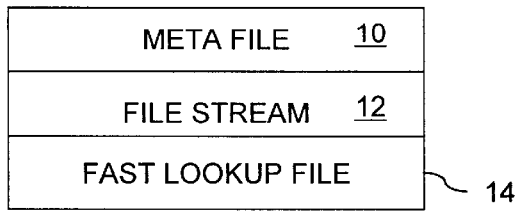
FIG. 7 is a partially schematic view of a cache backup volume according to the present invention.
Figure 9:
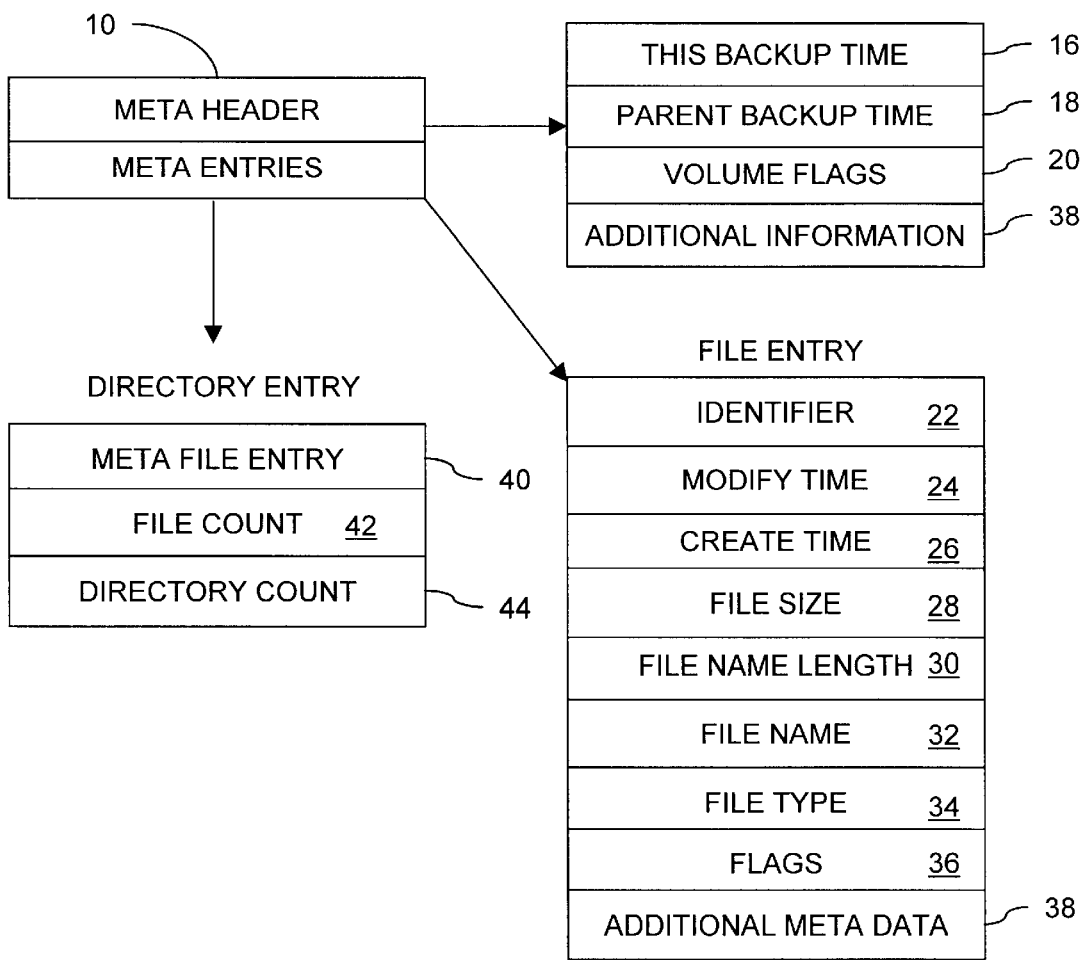
FIG. 9 is a partially schematic view of a meta file according to the present invention.
Figures 10, 11, 12:
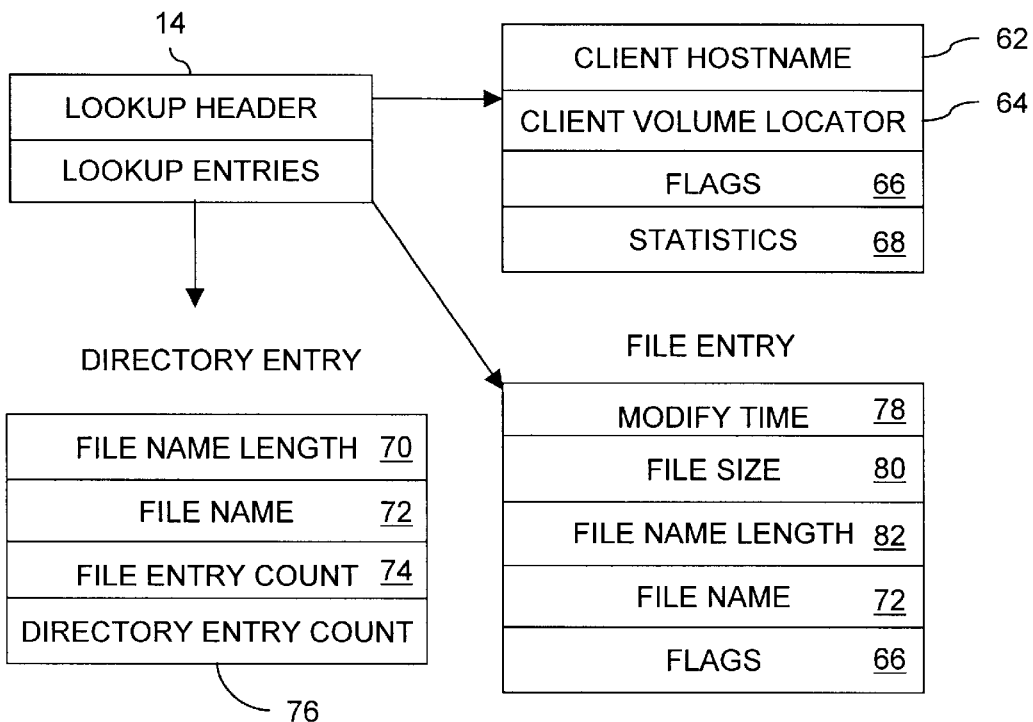
FIG. 10 is a partially schematic view of file stream entries according to the present invention.
FIG. 11 is a partially schematic view of a tape database entry according to the present invention.
FIG. 12 is a partially schematic view of a fast look-up file according to the present invention.
Figure 13:
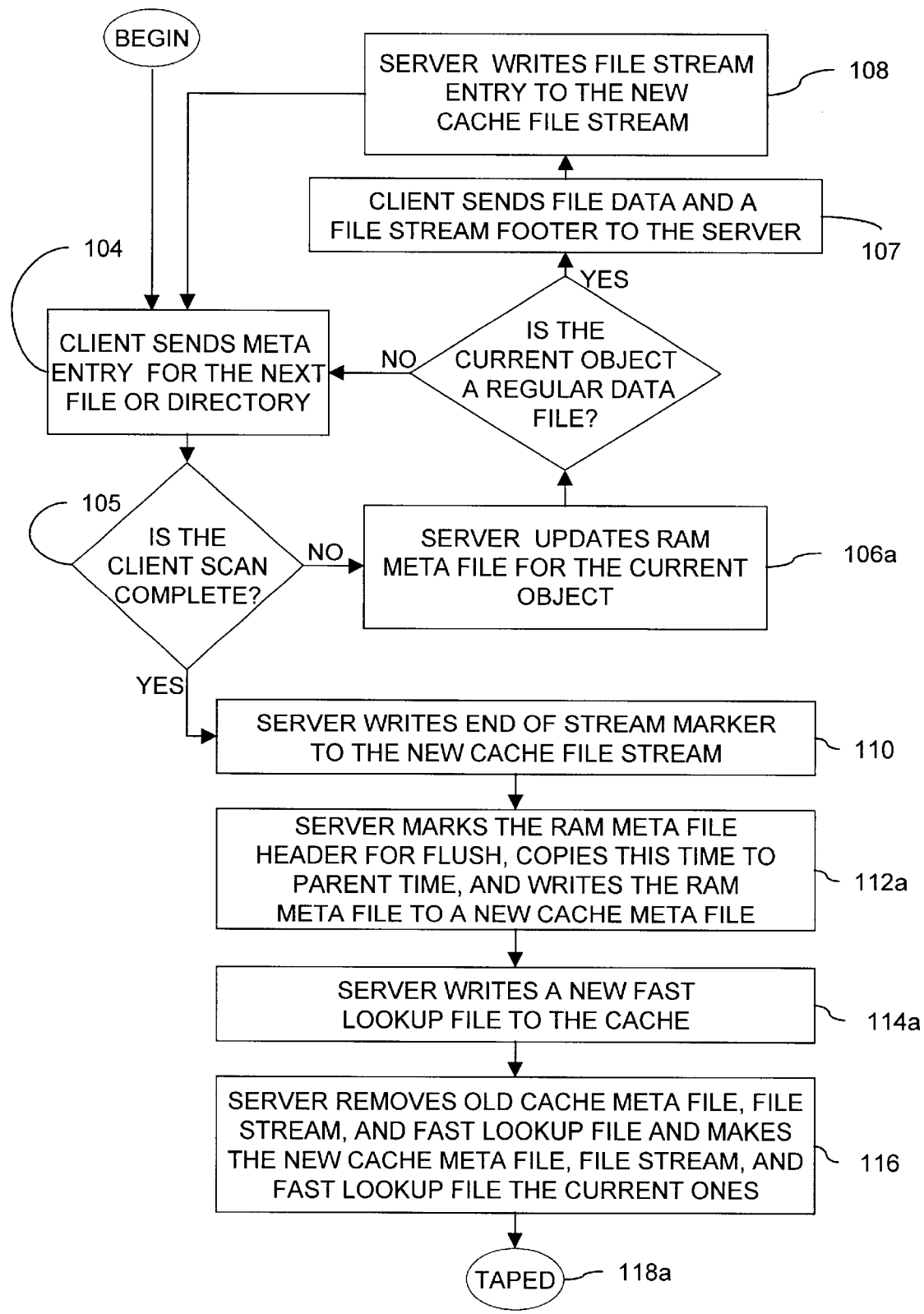
FIG. 13 is a flow chart illustrating the steps of a full network backup according to the present invention.
Figure 17:
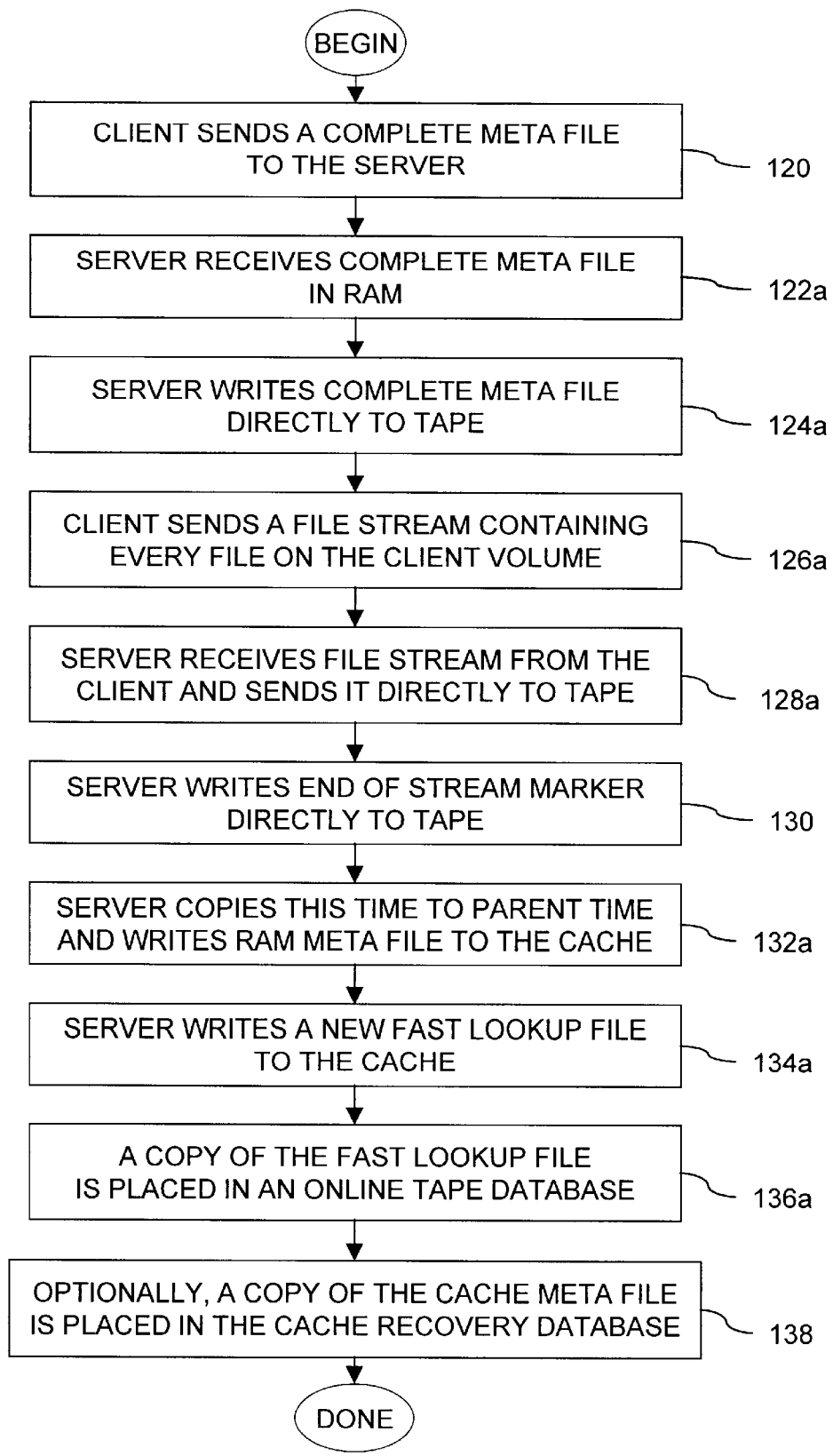
FIG. 17 is a flow chart illustrating the steps of a full network direct to tape backup according to the present invention.
Figure 21A:
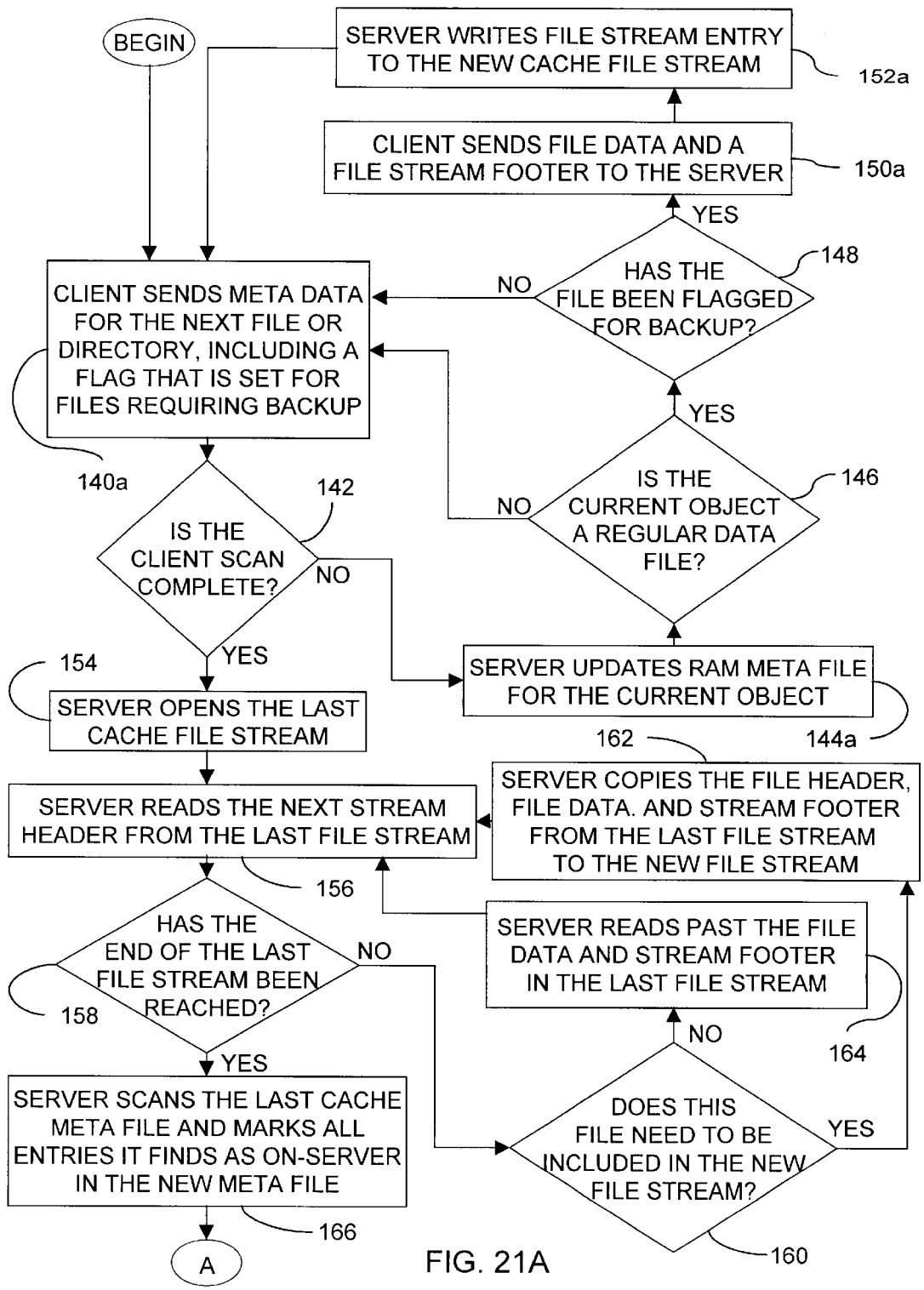
FIGS. 21A to 21B are a flow chart illustrating the steps of an incremental network merge backup according to the present invention.
Figure 21B:
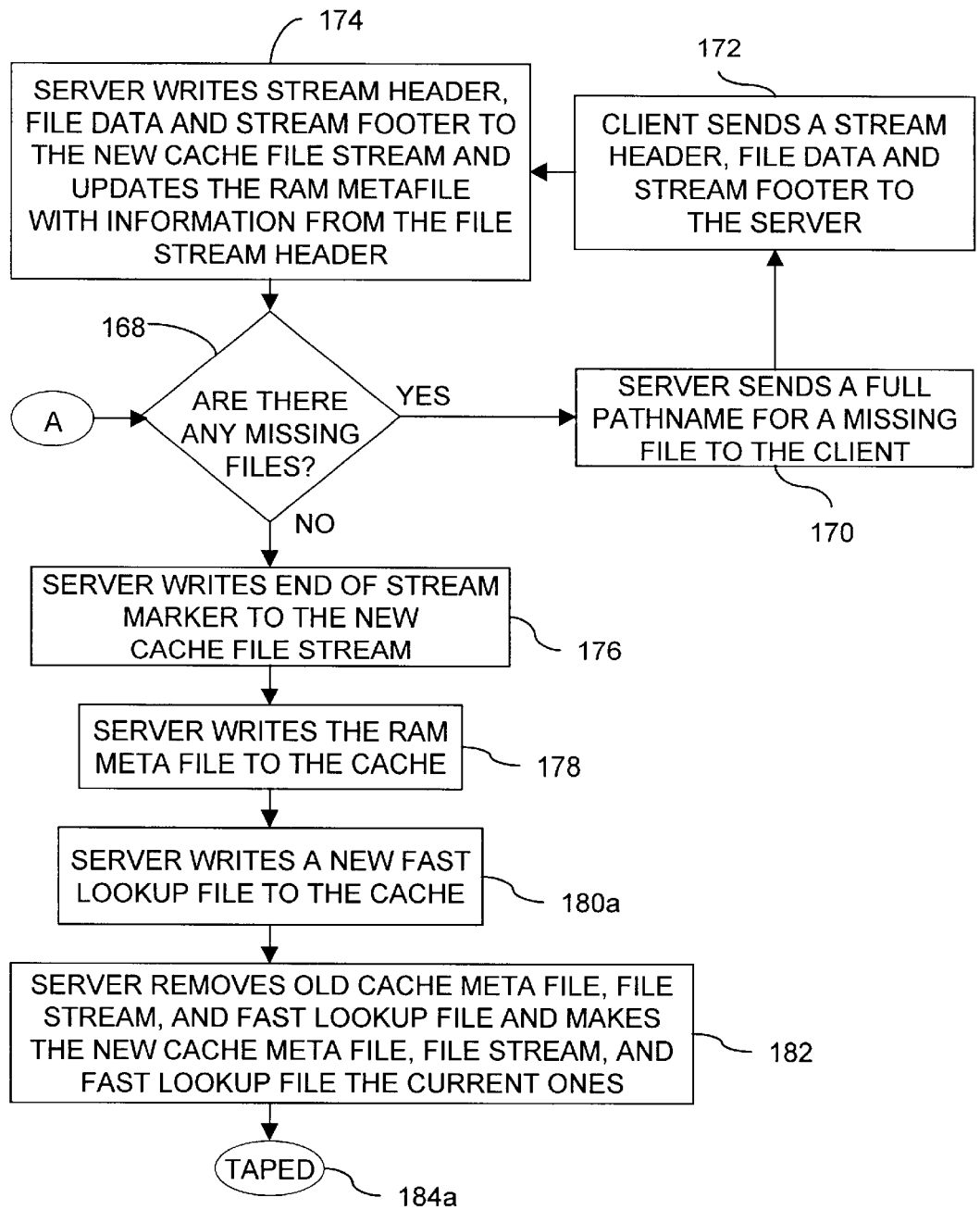
Figure 25:
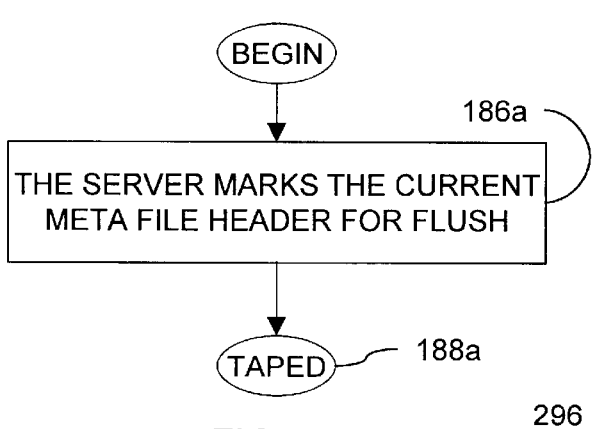
FIG. 25 is a flow chart illustrating the steps of a flush backup according to the present invention.
Figure 26:
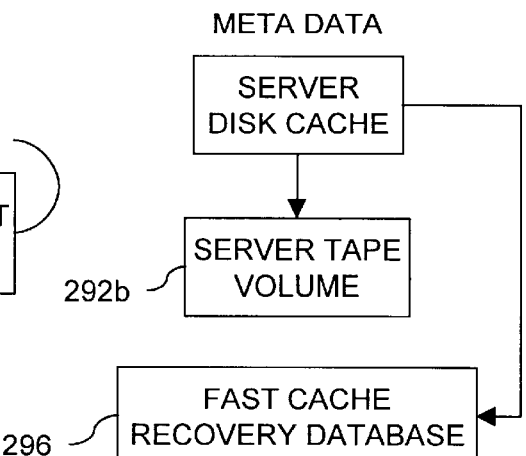
FIG. 26 is a flow chart illustrating the path of the metadata during a flush backup according to the present invention.
Figure 27:
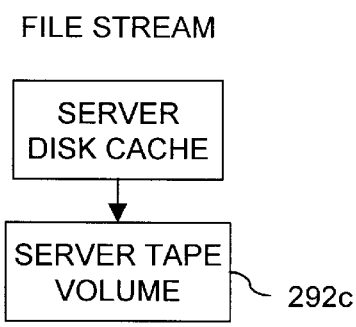
FIG. 27 is a flow chart illustrating the path of the file stream during a flush backup of the present invention.
Figure 28:
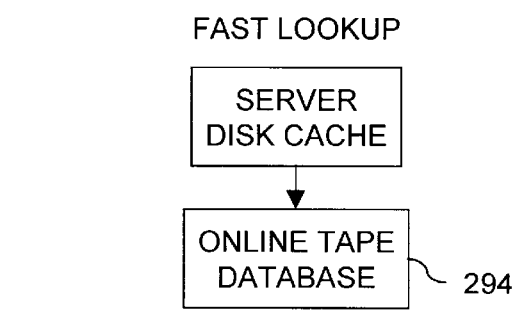
FIG. 28 is a flow chart illustrating the path of the fast look-up file during a flush backup according to the present invention.
Figure 29A:
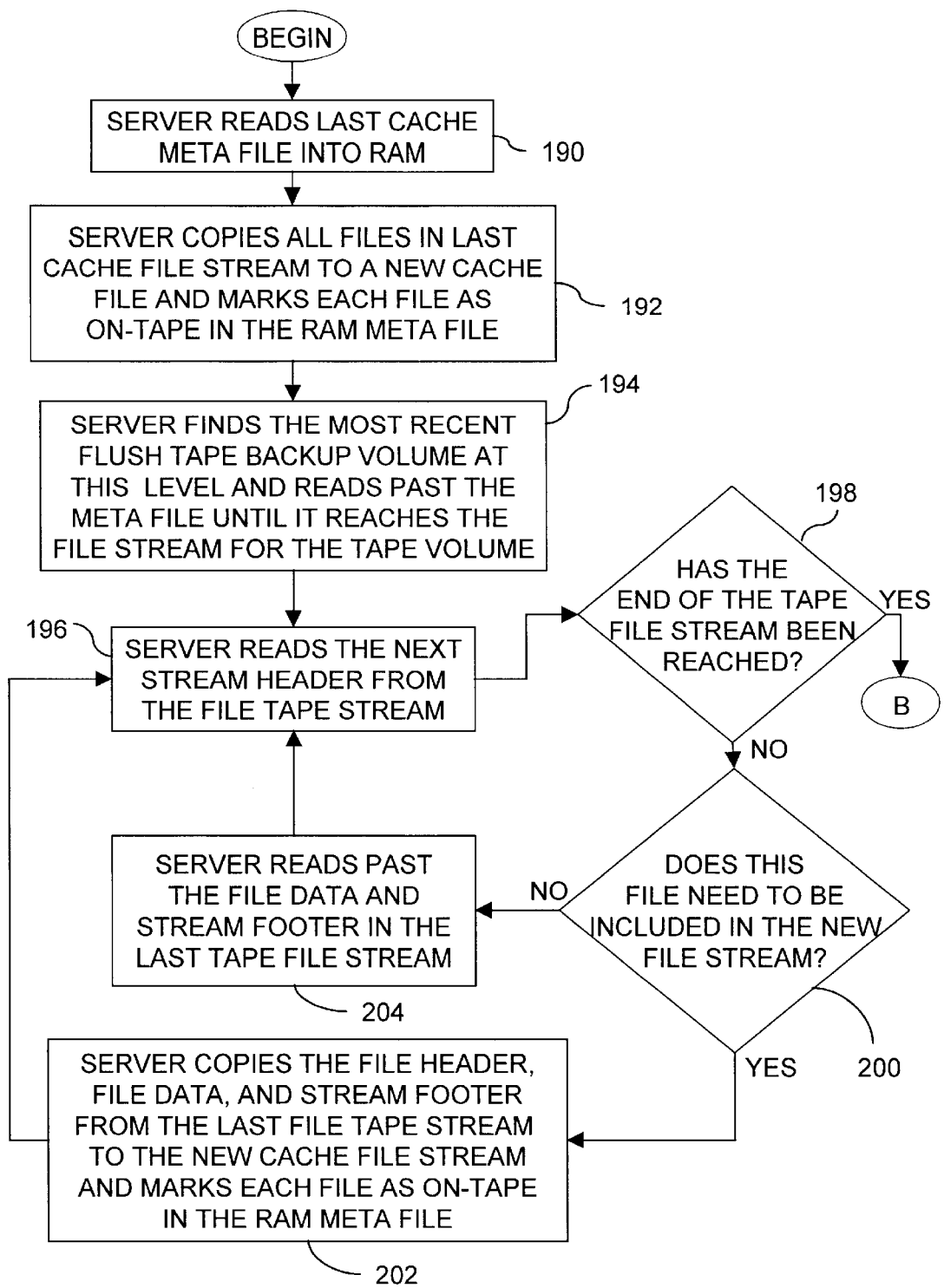
FIGS. 29A to 29B are a flow chart illustrating the steps of a flush merge backup according to the present invention.
Figure 29B:
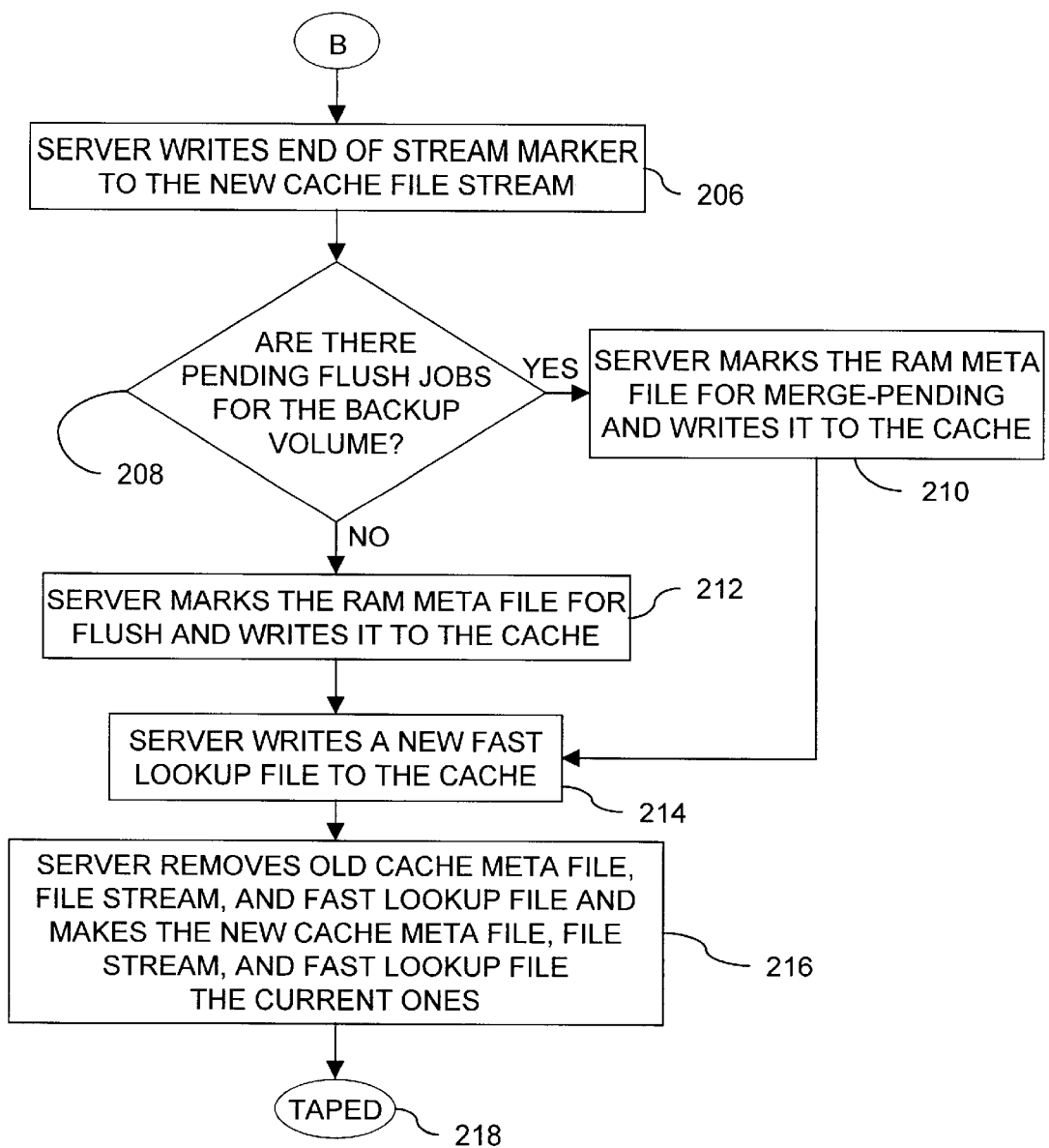
Figure 33A:
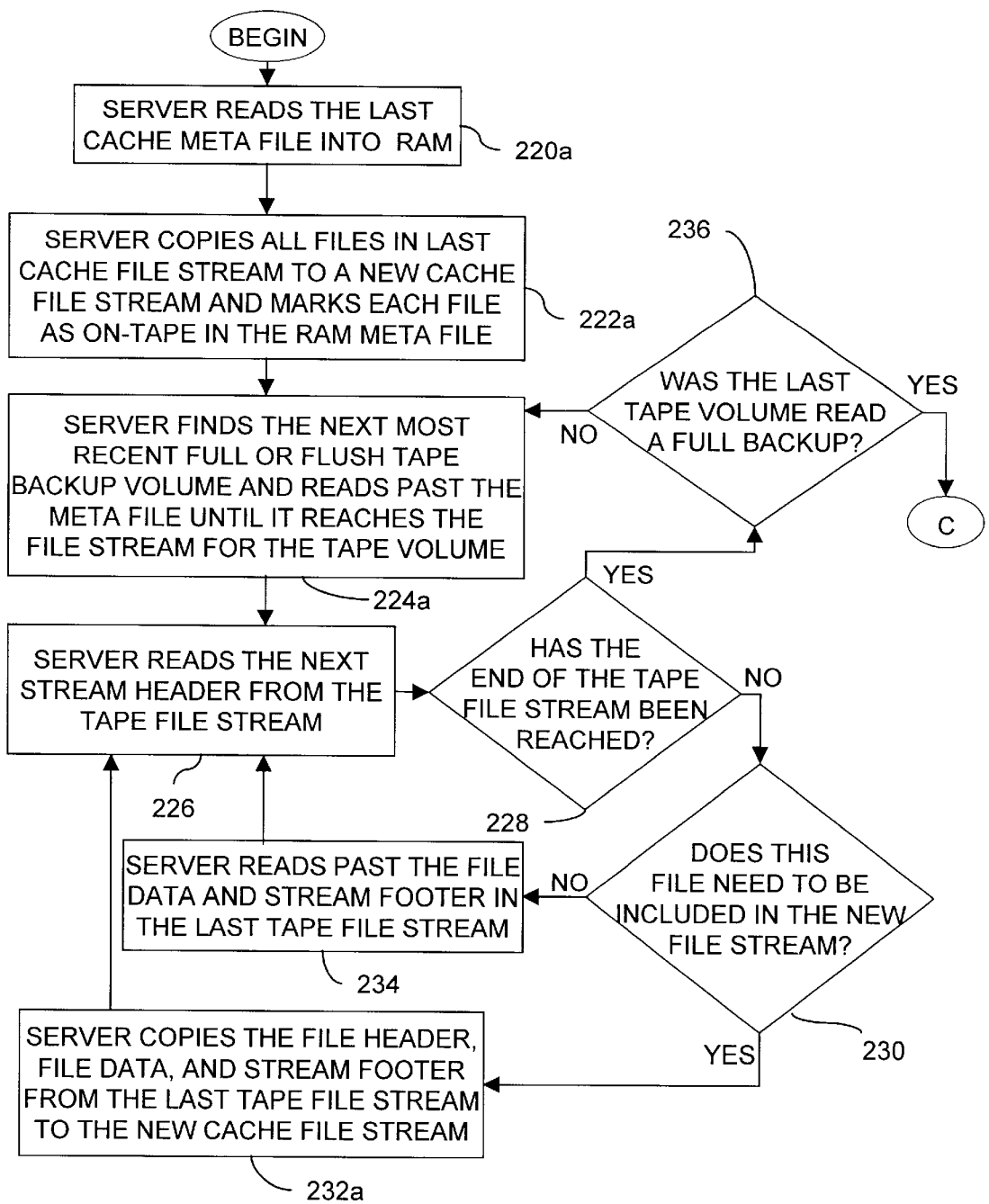
FIG. 33 is a flow chart illustrating the steps of a full merge according to the present invention.
Figure 33B:
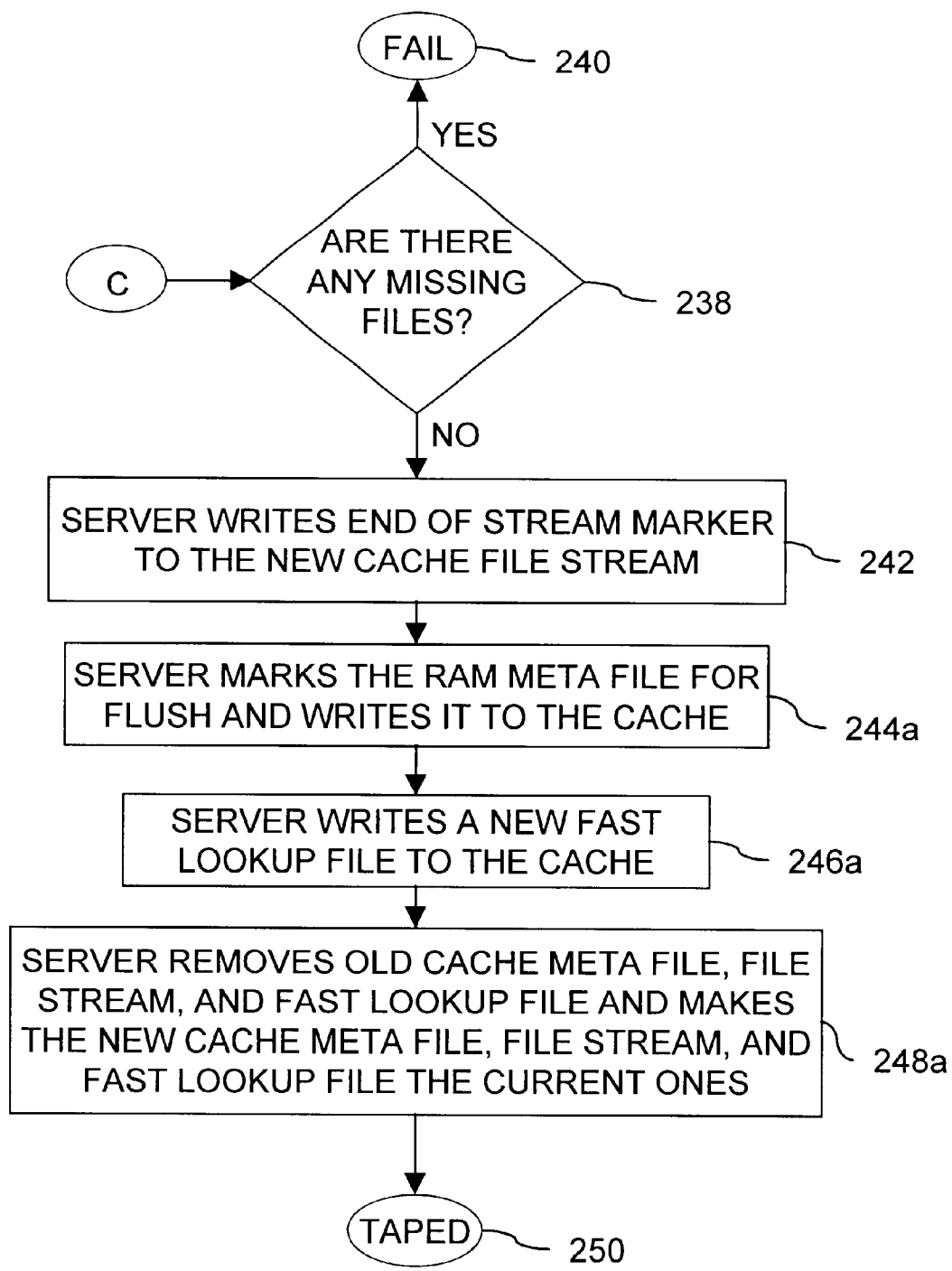
Figure 37A:
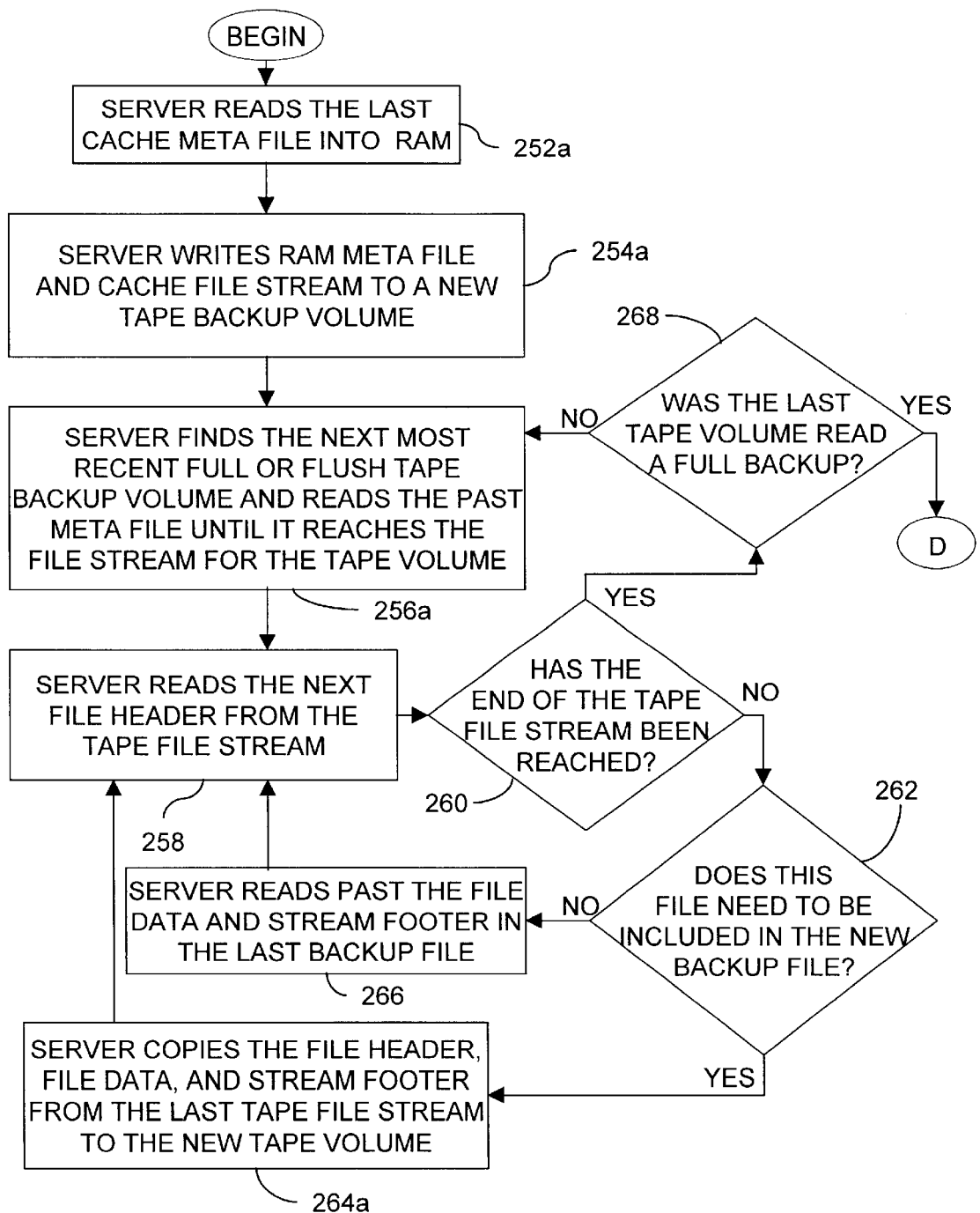
FIGS. 37A to 37B are a flow chart illustrating the steps of a full merge direct to tape backup according to the present invention.
Figure 37B:
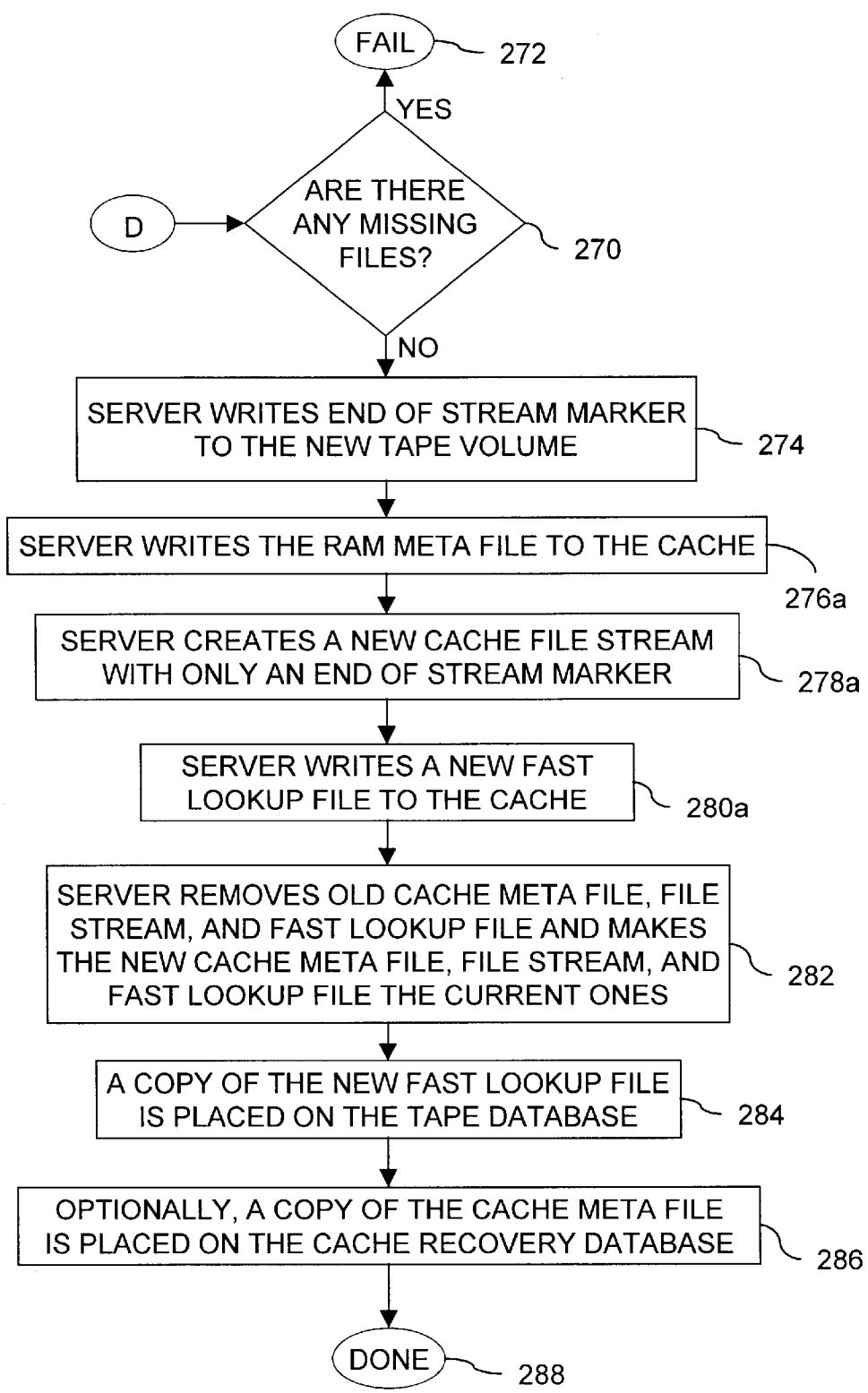
Figure 38:
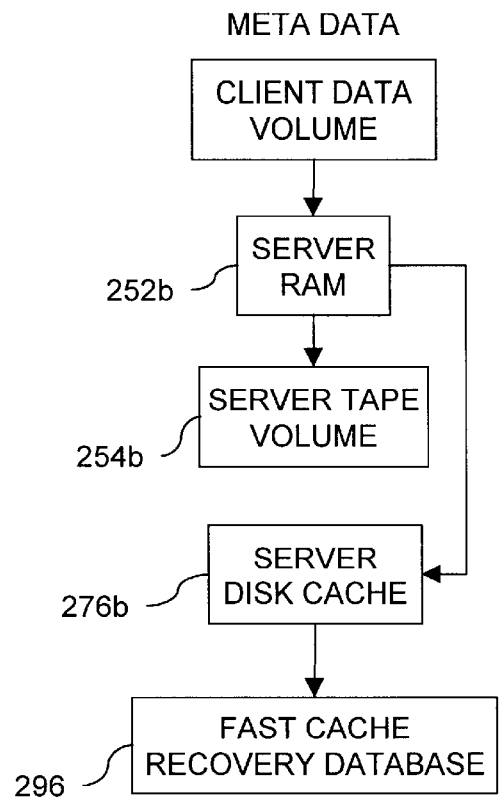
FIG. 38 is a flow chart illustrating the path of the metadata during a full merge direct to tape backup according to the present invention.
Figures 39, 40:
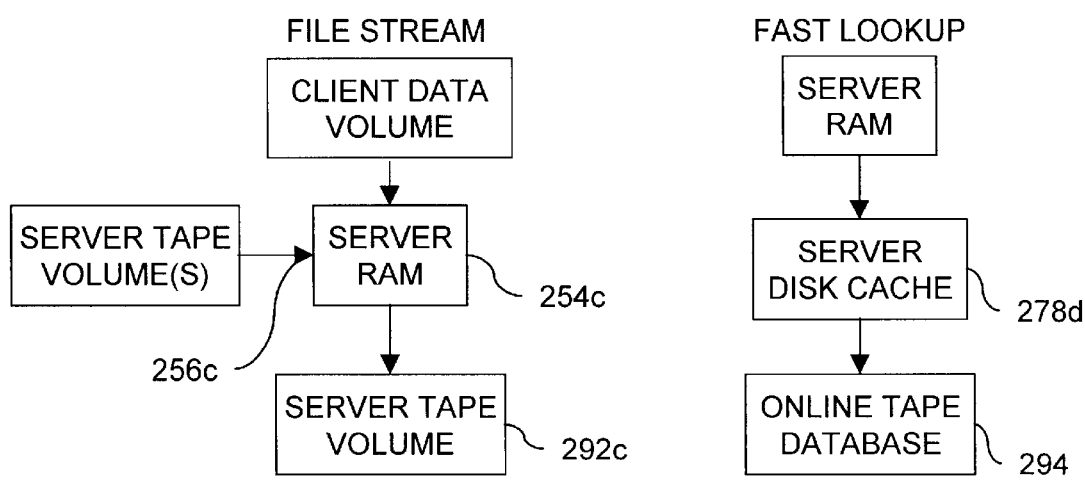
FIG. 39 is a flow chart illustrating the path of the file stream during a full merge direct to tape backup according to the present invention.
FIG. 40 is a flow chart illustrating the path of the fast look-up file during the full merge direct to tape backup according to the present invention.

This creates a new cache backup meta file 10, full file stream 12, and fast lookup file 14, as illustrated in FIG. 7. The meta file 10, illustrated at FIG. 9, contains all directory and file meta data information and additional information about the client volume such as the parent backup time 18, the current backup time, the operating system type and the full path location of the client volume 20, information about the file entry such as the file identifier 22, the modified time of the file 24, the time the file was created 26, the file size 28, the file name length 30, the file name 32, the file type 34, flags 36, and additional information 38, and information about the directory entry including the meta file entry 40, file count 42, and directory count 44. The file stream 12 is a stream of data that contains for each file a stream header that contains a file identifier 46, the file's modified time 48, the file size 50, the file type 52, various flags 54, the file data itself 56, the status of the file 58, a stream footer containing a file checksum 60 of the data from the specified storage method as illustrated in FIG. 10. Examples of storage methods include, but are not limited to, compression and/or encryption. Another suitable example would be the multiple backup streams for a single file employed in the trade-designated "NTFS" file system from Microsoft Corporation. From these examples, the advantages of multiple and complex storage strategies at the individual file level can be appreciated. Each file stream contains a final stream header that contains an end-of-stream indicator. The fast lookup file contains minimal information about the files and their parent directories in a backup volume as illustrated in FIG. 12, for example, the client host name 62, client volume locator 64, various flags 66, statistics 68, the file name length 70, the file name 72, the file entry count 74, the directory entry count 76, the time the file was modified 78, the file size 80, and the file name length 82. This information is used to view the contents of individual tape volumes without having the access the actual tape volume on tape.

Figure 8:
FIG. 8 is a partially schematic view of a tape backup volume according to the present invention.
Figure 41:
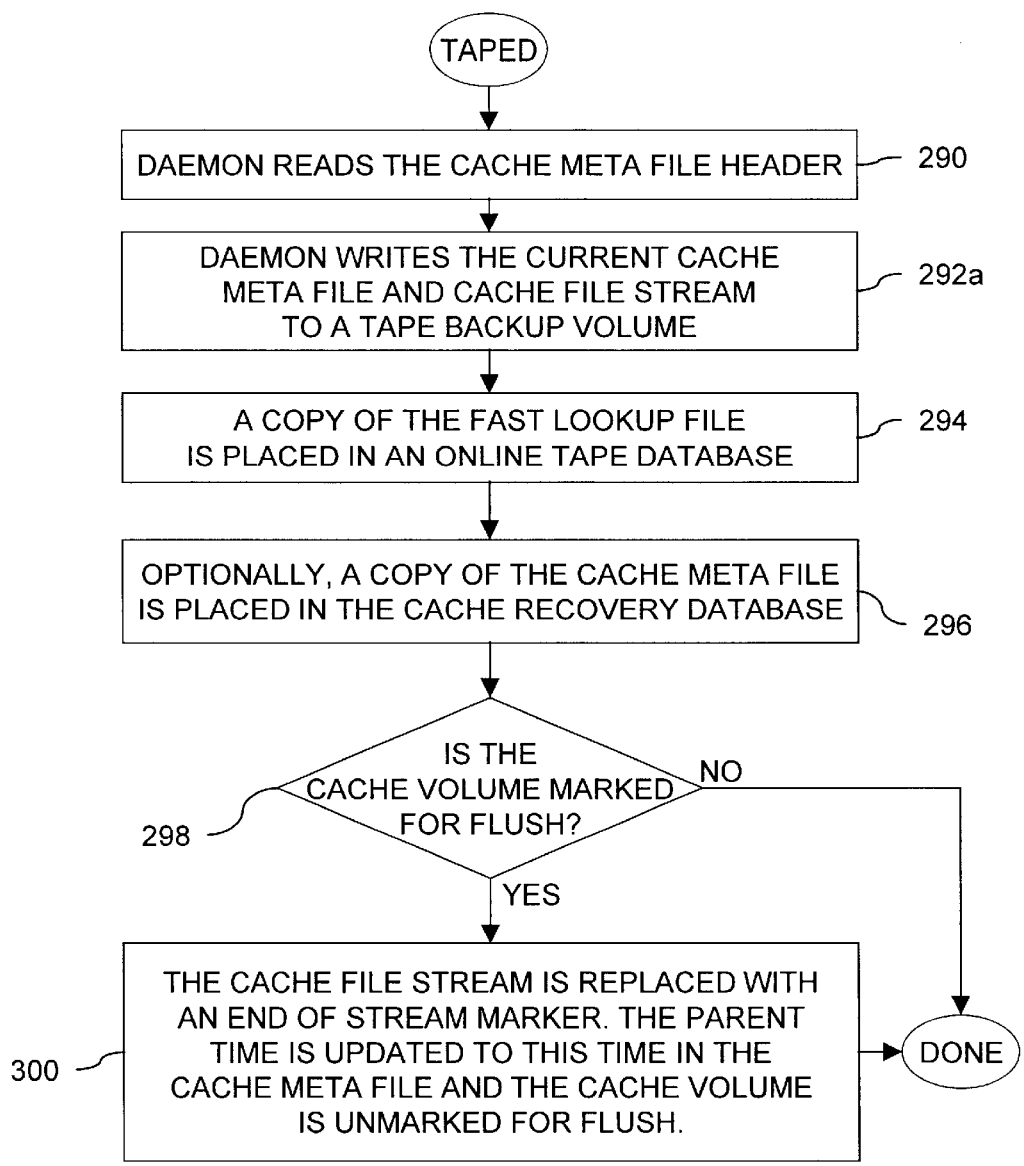
FIG. 41 is a flow chart illustrating tape daemon processing according to the present invention.

The meta file and file stream are concatenated and written to a single full tape backup volume on an external storage device illustrated in FIG. 8 and the file stream is then replaced with an empty file stream containing only an end-of-stream indicator as indicated at step 118 and then in FIG. 41. Initially, the daemon reads the cache meta file header at step 290. Next, the daemon writes the current cache meta file and cache file stream to a tape backup volume at step 292. A copy of the fast look-up file is placed in an on-line tape database at step 294. At this point, the backup system may optionally place a copy of the cache meta file in the cache recovery database at step 296. After checking to see if the cache volume is marked for flush at step 298 (for the full backup operation, the cache volume is always marked for flush as described above), for any cache so marked, the cache file stream is replaced with an end of stream marker, the parent time is updated to the present time in the cache meta file, and the cache volume is unmarked for flush at step 300.

The tape lookup database 86, illustrated in FIG. 11 is used to find individual files and/or directories without having to read the meta file for a given tape. The tape look-up data base 84 includes information including the tape pool 86, tape no. 88, tape off-set 90, client host name 92, client volume locater 94, time of this backup 96, the last backup time 98, and additional information 100. The fast look-up file 14 is also included, and a fast recovery meta file 102 may also be included. Optionally, a copy of the meta file may be placed in what is known as a fast cache recovery database. In the event of a cache hardware failure, this data may be used to quickly recover the cache state to a recent point in time, without having to recover information from one or more tapes.

The final state of the backup server contains a new meta file, an empty file stream, and a new fast lookup file in the backup cache, a meta file concatenated with a file stream on removable media, a copy of the fast lookup file in an online tape database and optionally a copy of the cache meta file in an online fast cache recovery database.

An alternative method for taking a complete network backup from the client bypasses the cache for very large client volumes is by sending a meta file and a file stream directly to tape. This method is illustrated at FIGS. 2 and 17–20. If the backup server does not have a cache meta file, a time stamp of 0 is sent to the backup client. The client sends first a complete copy of the client volume's meta data to the server at step 120. The server stores all meta data in RAM at step 122, updating the parent backup time 18 with the current backup time 16, and writes the entire meta file from RAM to tape at step 124 once it has been completely received from the client. Next, the client sends a file stream containing information in various formats as described above at step 126. The server directs the file stream directly to tape until an end-of-stream marker is received from the client at step 128. The server writes the end-of-stream maker to the tape volume and closes the tape device at step 130. A copy of the meta data is written to the cache along with a file stream that contains only an end-of-stream indicator at step 132, and a fast lookup file at step 134. A copy of the fast lookup file and optionally the meta file is/are stored within a tape lookup database at steps 136 and 138, respectively.

The final state of the backup server contains a new meta file, an empty file stream, and a new fast lookup file in the backup cache, a meta file concatenated with a file stream on removable media, a copy of the fast lookup file in an online tape database and optionally a copy of the cache meta file in an online fast cache recovery database.

In another aspect of the invention illustrated in FIGS. 3 and 21A–24, if the backup server already has a meta file, the method determines the last backup time 16 from the meta file and sends that time stamp to the backup client. The backup client then sends a meta header containing the current time for the backup time and metadata for each file and directory currently on the backup client, including a flag that is set for files requiring backup, and file and stream footer data for files that have been modified or created since the last backup time, at step 140. After checking to see if the client scan is complete at step 142, the server updates the RAM meta file for the current object at step 144, and then checks to see if the object in the cache is a regular data file at step 146. If so, the server then checks to see if the file has been flagged for backup at step 148. If so, the client sends a file data and a file stream footer to the server at step 150, and the server writes the file stream entry (getting the file stream header information from the file metadata and the file data and file stream footer from the previous step) to the new cache file stream at step 152. Explained differently, a file stream containing all files that have a modify or create time that is greater than or equal to the last backup time stamp is sent to the backup server using the same single pass scan algorithm described above.

Once the client sends the end of stream marker, the server merges the previous cache file stream with the new cache file stream to creates a new cache incremental file stream. This is a stream of data that, for each file sent from the backup client, contains a stream header, the data for a file, and a stream footer in varying formats as described above. The new cache is updated by opening the last cache file stream at step 154, reading the next stream header from the last file stream at step 156, checking to see if the end of the last file stream was reached at step 158, checking to see if the file needs to be included in the new file stream at step 160, and then (if so) copying the file header, file data, and stream footer from the last file stream to the new file stream at step 162. If the file does not need to be included in the new file stream, for example, if a later version of the same file is already in the cache, the server reads past the file data and stream footer in the last file stream at step 164.

Next, the backup server reads the previous meta file from the cache and marks the new meta file in RAM with all data files that currently reside on the backup server that are not currently in the new incremental file stream at step 168. Any files in the new meta file that do not exist or are out of date on the backup server are requested from the backup client at step 170 to complete the transfer. The client sends a stream header, file data, and stream footer to the server at step 172. The server writes the stream header, file data, and stream footer to the new cache file stream and updates the RAM metafile with information from the stream header at step 174. For example, files that are placed on a UNIX system via the tar command may have both create and modify times that are older than the current backup time. The backup time stamp will not predict that these files need to be backed up. This retry phase is an important step in ensuring that a backup client is reporting these file changes properly. Once the retry phase is completed connection with the backup client is closed.

An end-of-file-stream indicator is written at the end of the new cache file stream at step 176. A new meta file and fast lookup file are written to the backup cache at steps 178, 180, respectively. The current cache meta file, file stream and fast lookup file are replaced with the new cache meta file, file stream, and fast lookup file at step 182. A copy of the fast lookup file is stored within the tape lookup database once the backup volume has been successfully written to tape. There is no saving of the fast cache recovery meta file for incremental backup volumes.

Next, referring to step 184 and in FIG. 41, the tape daemon reads the cache meta file header at step 290. Next, the daemon writes the current cache meta file and cache file stream to a tape backup volume at step 292. A copy of the fast look-up file is placed in an on-line tape database at step 294. At this point, the backup system may optionally place a copy of the cache meta file in the cache recovery database at step 296. After checking to see if the cache volume is marked for flush at step 298 (for an incremental backup, the cache will never be marked for flush), for any cache so marked, the cache file stream is replaced with an end of stream marker, the parent time is updated to the present time in the cache meta file, and the cache volume is unmarked for flush at step 300. The final state of the backup server contains a new meta file, an incremental file stream, and a new fast lookup file in the backup cache, a meta file concatenated with an incremental file stream on removable media, a copy of the fast lookup file in an online tape database, The present invention also provides a method for indicating when a file stream should be removed or "flushed" from the backup cache. A method is provided for creating a concatenated tape backup volume called a "flush" volume containing the current cache meta file and the current cache file stream, as illustrated in FIGS. 4 and 25–28. This is performed at step 186. A tape daemon as illustrated at step 188 and in FIG. 41 reads the cache meta file header at step 290. Next, the daemon writes the current cache meta file and cache file stream to a tape backup volume at step 292. A copy of the fast look-up file is placed in an on-line tape database at step 294. At this point, the backup system may optionally place a copy of the cache meta file in the cache recovery database at step 296. After checking to see if the cache volume is marked for flush at step 298, for any cache so marked, the cache file stream is replaced with an end of stream marker, the parent time 18 is updated to the current time 16 in the cache meta file, and the cache volume is unmarked for flush at step 300. In a preferred embodiment of the invention, the new backup volume is copied simultaneously to two separate removable media. The purpose is to maintain a "tape chain" wherein the most recent backup performed can be successfully restored even if any one tape in the system is found bad. The tape chain represents the fact that the most recent backup from the backup cache was removed, but copied to two separate media, maintaining the redundancy requirement even if the incremental backup volume that the tape chain mirrors is recycled.

In either situation, the contents of the backup cache looks similar to how it would if a full backup either from the network or via a merge backup had just been performed. It is recommended that both tapes used in creating the tape chain be retained until at least after new full backup volumes have been created using all of the flush volumes on the tape pair.

As an alternative to just flushing, the present invention also provides a method and system for indicating when a new flush tape backup volume should be generated by merging cumulative incremental backup data in the disk cache with a previous flush tape volume, as illustrated in FIGS. 5 and 29A–32.

The current cache meta file is read into RAM at step 190. The current cache file stream is copied to a new cache file stream (not including the end-of-stream-marker) at step 192. The previous flush tape backup volume is located, and the server reads past the meta file until it reaches the file stream for the tape volume, at step 194. The server then reads the next stream header from the tape file stream at step 196. After checking to see if the end of the tape file stream has been reached at step 198, the server checks to see if each file in the previous flush tape backup volume that is in the new meta file is also in the new file stream at step 200. If the file on tape is an earlier version of a later file in the cache (indicating that the file was updated), or the file on tape is not represented in the present metafile (indicating that the file was deleted), the file on tape is skipped. Otherwise, the server copies the file header, file data and stream footer from the last tape file stream to the new cache file stream and marks each file as on tape in the RAM meta file at step 202. If so, the server reads past the file data and stream footer in the last tape file stream at step 204. Each file in the previous flush tape backup volume that is in the new meta file, but not in the new file stream, is thereby copied from the previous flush tape backup volume to the new cache file stream. An end-of-file-stream indicator is written at the end of the new cache file stream at step 206. The server checks to see if there are pending flush jobs for the backup volume at step 208. If so, the server marks the RAM meta file for merge pending and writes it to the cache at step 210. If not, the server marks the RAM meta file for flush and writes it to the cache at step 212. A new fast lookup file is written to the backup cache at step 214. The current cache meta file, file stream and fast lookup file are replaced with the new cache meta file, file stream, and fast lookup file at step 216.

The new cache meta file and file stream are concatenated and written to a new tape flush volume, as illustrated at step 218 and in FIG. 41. Initially, the daemon reads the cache meta file header at step 290. Next, the daemon writes the current cache meta file and cache file stream to a tape backup volume at step 292. A copy of the fast look-up file is placed in an on-line tape database at step 294. At this point, the backup system may optionally place a copy of the cache meta file in the cache recovery database at step 296. After checking to see if the cache volume is marked for flush at step 298, for any cache so marked, the cache file stream is replaced with an end of stream marker, the parent time 18 is updated to the current time 16 in the cache meta file, and the cache volume is unmarked for flush at step 300.

The flush merge process may be performed in several levels, simulating the multiple backup levels provided by a traditional level backup system. The backup server determines if there is an outstanding request for a lower level full or flush merge. If there is no outstanding request, the contents of the cache file stream are replaced with an end of stream marker. Otherwise the cache meta file is marked as merge-pending. The merge-pending state prevents any other type of backup except for the pending job from being performed. This is important for maintaining the redundancy of tape backup volumes as products of other tape backup volumes.

The present invention also provides a method and system for indicating when a new full tape backup volume should be generated as illustrated in FIGS. 6 and 33A–36. The server examines the online tape database to determine which full and possibly flush tape volumes will be read.

The current cache meta file is read into RAM at step 220. The current cache file stream is copied to a new cache file stream (not including the end-of-stream-marker) at step 222. Moving first from the most recent tape volume, each file in the previous tape backup volume that is in the RAM meta file, but has not yet been written to the new file stream, is copied from the previous tape backup volume to the new cache file stream at step 224. Once all of the tape volumes have been read, the server checks the RAM meta file to ensure that a copy of every current file and directory is on the new tape backup volume. This is performed by first finding the next most recent full or flush tape backup volume, and reading past the meta file until the file stream for the tape volume is reached at step 224, reading the next stream header from the tape file stream at step 226, determining whether the end of the tape file stream has been reached at step 228, and then determining whether a copy of the current file is on the new cache file stream at step 230. If the file is not on the new cache file stream, the server copies the file header, file data, and stream footer from the last tape file stream to the new cache file stream at step 232. If the file is present on the new cache file stream, the server reads past the file data and stream footer in the last tape file stream at step 234. Once the most recent full backup is reached and processed at step 236, the meta data and previous full backup are checked to ensure that all files are complete at step 238. If any files are not found to be complete, the backup system will require a full backup at step 240. Otherwise, the server writes an end of stream marker to the new cache file stream at step 242. This is an important sequence of process control steps that ensures that data is not being lost through merge processing. A new meta file and a new fast lookup file are written to the backup cache at steps 244 and 246, respectively. The current cache meta file, file stream and fast lookup file are replaced with the new cache meta file, file stream, and fast lookup file at step 248. Referring to step 250 and FIG. 41, the tape daemon reads the cache meta file header at step 290. Next, the daemon writes the current cache meta file and cache file stream to a tape backup volume at step 292. A copy of the fast look-up file is placed in an online tape database at step 294. At this point, the backup system may optionally place a copy of the cache meta file in the cache recovery database at step 296. After checking to see if the cache volume is marked for flush at step 298 (which will always be the case here), for any cache so marked, the cache file stream is replaced with an end of stream marker, the parent time 18 is updated to the current time 16 in the cache meta file, and the cache volume is unmarked for flush at step 300.

The final state of the backup server contains a new meta file and a new fast lookup file in the backup cache and a new meta file concatenated with a new full file stream on removable media. A copy of the fast lookup file is stored within the tape lookup database once the backup volume has been successfully written to tape. Optionally a copy of the cache meta file is stored in a fast cache recovery database.

An alternative method for creating new full tape backup volumes is provided for a very large client volume that has a file stream that cannot be processed within the server's backup cache as illustrated in FIGS. 37A–40. The server examines the online tape database to determine which full and possibly flush tape volumes will be read.

The current cache meta file is read into RAM at step 252. The parent backup time 18 is updated to the current backup time 16. The RAM meta file is written to the new full tape backup volume at step 254. Then all of the files in the current incremental file stream are appended to the new full tape backup volume (not including the end-of-stream-marker). Moving first from the most recent tape volume, each file in the previous tape backup volume that is in the RAM meta file, but has not yet been written to the new full tape backup volume, is copied from the previous tape backup volume to the new full tape backup volume. This is performed by first finding the next most recent full or flush tape backup volume, and reading past the meta file until the file stream for the tape volume is reached at step 256, reading the next stream header from the tape file stream at step 258, determining whether the end of the tape file stream has been reached at step 260, and then determining whether a copy of the current file is on the new tape backup volume at step 262. If the file on the previous tape is an earlier version of a later file on the new tape (indicating that the file was updated), or the file on the previous tape is not represented in the present metafile (indicating that the file was deleted), the file on tape is skipped at step 266. Otherwise, the server copies the file header, file data, and stream footer from the last tape to the new tape at step 264. Once the most recent full backup is reached and processed at step 268, the meta data and previous full backup are checked to ensure that all files are complete at step 270. If any files are not found to be complete, the backup system will require a full backup at step 272. This is an important process control step that ensures that data is not being lost through merge processing. Otherwise, an end-of-file-stream indicator is written at the end of the new full tape backup volume once the previous full tape backup volume has been completely scanned at step 274. A new meta file is written to the backup cache at step 276, a new cache file stream with only an end of stream marker is created at step 278, and a new fast look-up file is written to the cache at step 280. The current cache meta file, file stream and fast lookup file are replaced with the new cache meta file, file stream, and fast lookup file at step 282.

The final state of the backup server contains a new meta file and a new fast lookup file in the backup cache and a new meta file concatenated with a new full file stream on removable media. A copy of the fast lookup file is stored within the tape lookup database at step 284 and optionally a copy of the cache meta file is stored in a fast cache recovery database at step 286.

Figure 42:
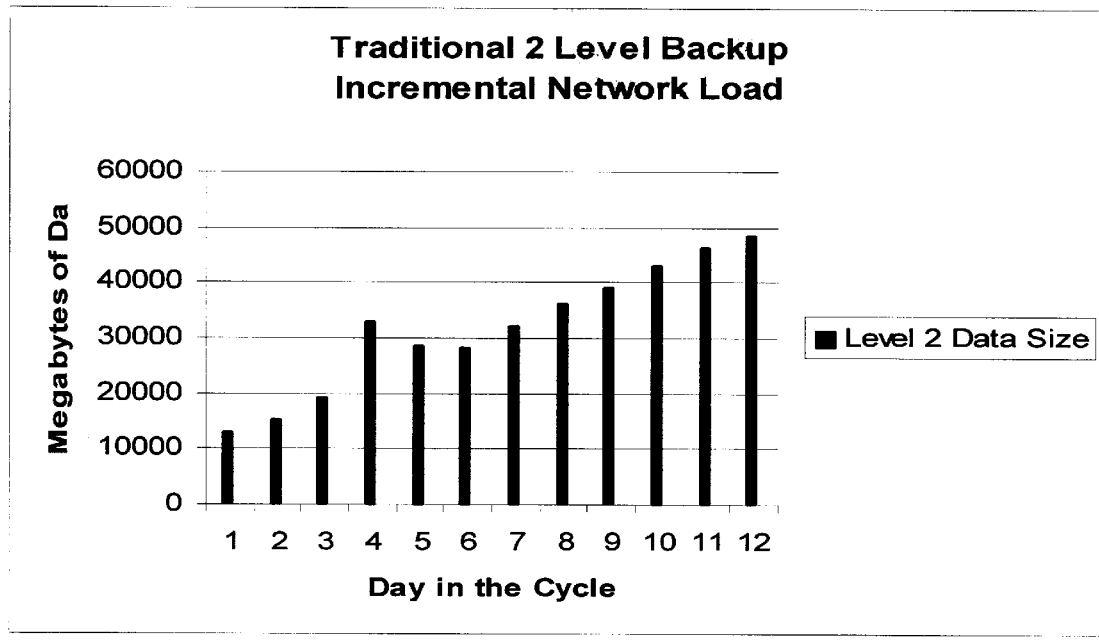
FIG. 42 is a graph illustrating the incremental network load increases resulting from traditional backup systems.
Figure 43:
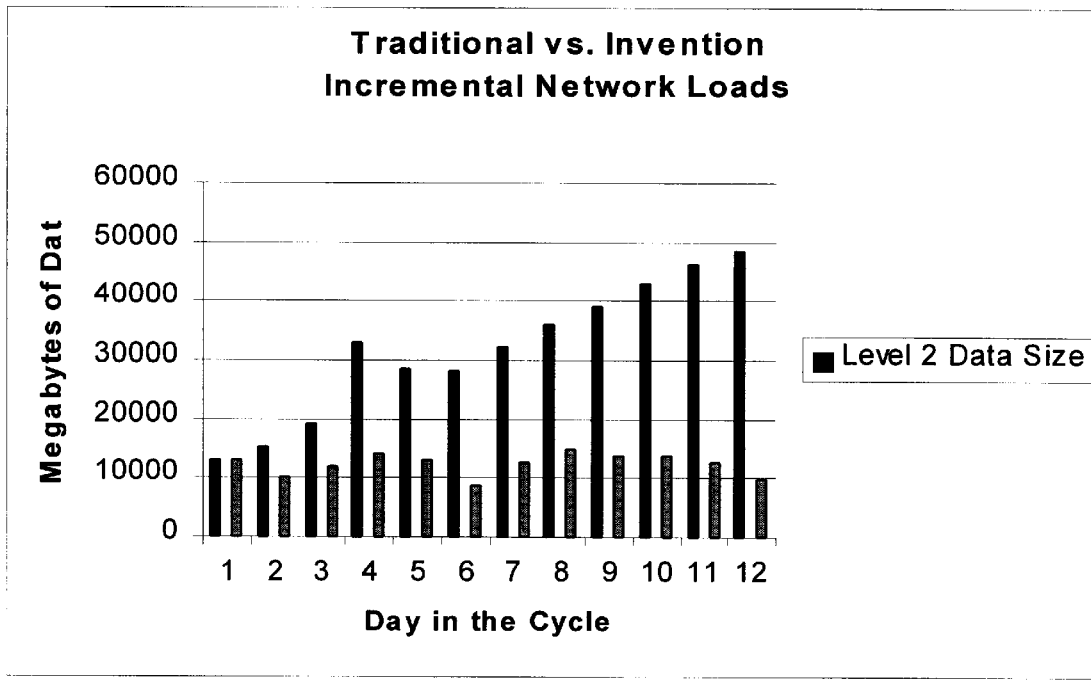
FIG. 43 is a graph illustrating incremental network loads for both traditional backup systems and the present invention.
Figure 44:
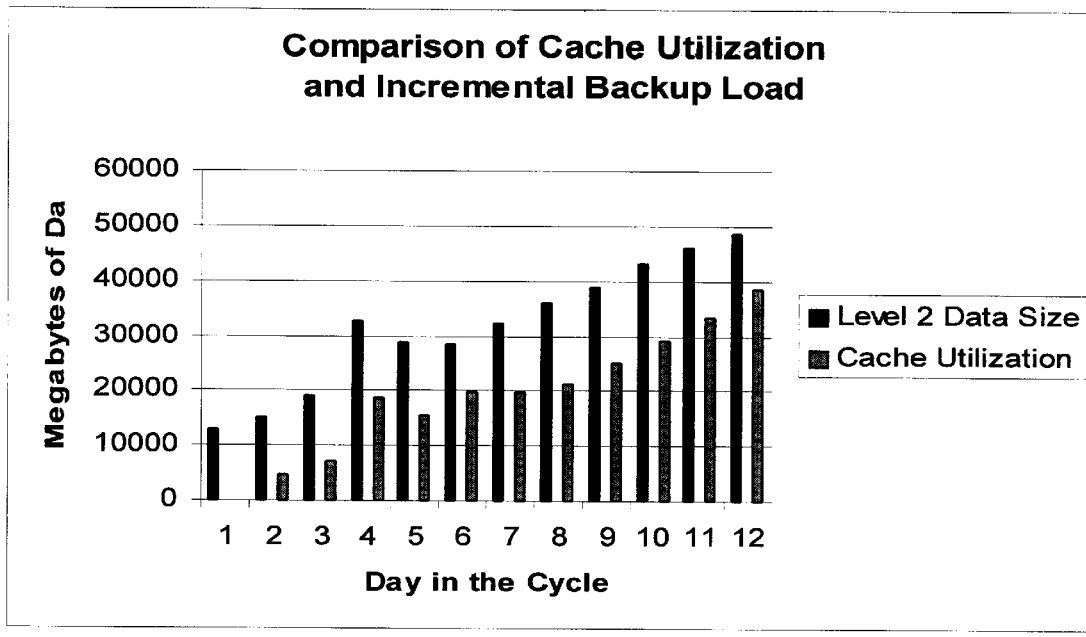
FIG. 44 is a graph illustrating cache utilization for traditional backup systems and the present invention.

FIG. 42 illustrates an example of how a traditional two-level backup performs over a two-week period. The example starts on a Monday, and no incremental backup is taken on the first Sunday. A full backup is taken on the second Sunday. Incremental backups are run on a twelve-day cycle. Over this period of time, it can be appreciated that substantially linear growth occurs in the amount of data that must be backed up over the network. Applying this illustrative example to the invention, the merging system and method provide a backup server that tracks both the total amount of data originating from the network and from the backup server cache for each backup. FIG. 43 shows the effect of reusing data in the backup server cache on the network loads over the same two-week period: The backup server provided by the invention therefore "flattens" the network requirement for backup by only copying over the network files that have been modified or created since the last backup. The remaining files are taken from the backup cache. FIG. 44 demonstrates how the backup server's cache utilization maintains pace in this example with the steady growth of incremental data over time.

In another aspect of the invention, a backup method and system are provided that further leverage the process of reusing data. The invention can, for example, merge all incremental data gathered from the client in the backup cache with a prior, full data backup stored on a storage device (such as on tape) to produce a new, full backup volume. This new backup volume is substantially identical to one that would have been taken from the backup client at that time. Full backups can therefore be generated with little or no interaction with the backup clients or the network.

There are several types of backup methods and systems provided by the invention:

Network Full:

All files, directories, and meta data are backed up from the backup client to the server.

Network Incremental:

All directory and meta information is sent from the backup client to the backup cache (The size of this data is typically less than ½ of 1% of the total data on the client system). Only those files that have changed since the last backup are sent from the client. The server then merges previous incremental backup data, omitting obsolete or deleted files to generate a new incremental backup volume that can then be copied to a storage device, such as a tape.

Archive:

An optional step that copies the changes sent from a client each time an incremental backup is run. Archive tapes can contain a single copy of every file revision taken from the backup client.

Flush:

This special type of backup can be used to copy incremental data from the backup cache to a flush tape. The file data from the backup cache is then removed. This backup operation can be used to keep the backup cache from overflowing while maintaining the redundancy of current incremental data.

Merge Flush:

Current incremental data in the backup cache is merged with the most recently stored flush backup to produce a new flush backup that can then be copied to a storage device, such as a tape. This process can be used to produce the equivalent of any number of levels of a traditional multi-level backup system.

Merge Full:

Current incremental data in the backup cache is merged with the most recently stored full backup and possibly other flush and incremental backups to produce a current full backup that can then be copied to a storage device, such as a tape.

Conventional use of these backup methods and systems can reduce the network and client load for the backup function by about 75% to 95% (or about 4 to 20 times). The efficiency for each system implementation depends on several key factors:

Current Schedule:

Frequency of full backups and how many levels are in the current schedule are both important factors. In general, methods/systems that generate full backups more frequently benefit the most by eliminating full backups completely, while methods/systems that use more complex schedules may enjoy other benefits such as fewer tape reads per restore.

Average Data Rate:

This is the average of the size of data taken on each incremental backup during a backup operation. It can be estimated by totaling the tape utilization for incremental backups taken between two full backups and dividing that sum by the number of incremental backups taken during the cycle.

Average Network Rate:

This is the average of the invention data depicted in FIG. 43. This number is typically difficult to estimate, but is important for predicting the efficiency of the method and system of the present invention. This value is typically in the range of approximately 1% to 2% of the total data size.

The following example is presented for illustration-purposes only and is not intended to limit the scope of the invention. A simple model can be calculated for predicting the efficiency of the method and system of the present invention for a standard two level backup.

Let:

C=the number of days in a backup cycle (includes one day for full backup)

R=the average daily data rate as a percent of total data

N=the average daily data network rate as a percent of total data

Then, the network utilization for a single backup cycle would be as follows:

|  | Traditional | Invention |
|---|---|---|
| Day 1: | 100 | N |
| Day 2: | R | N |
| Day C: | R | N |

Total=100=(C−1)R    Total=CN

Efficiency=1−(CN÷(100+(C−1)R))

For the sample data obtained from the illustrative example in FIGS. 42 through 44, the following can be calculated:

C=14

R=3.06%

N=1.18%

Efficiency=88.2%

Reduction in Network Bandwidth=8.4 Times

Because previous full backup data is reused in the generation of new backups in the invention, the implications for offsite (or other otherwise remote from the client) tape management are significant. As can be seen and understood, because each generated full tape (except for the first) is a product of the contents of two other storage devices (an older full backup and an incremental backup), at any given time there are two copies of each full backup (one is the product of two storage devices). By modifying the process for offsite storage it is possible to retain a full copy of data both offsite and onsite without maintaining two complete copies of each full backup tape. The cost to modify the offsite process can be offset by the savings in offsite retrieval. Many restore requests can be processed with tapes already onsite with the client, and this can substantially reduce the cost to pull tapes or other storage devices from an offsite location.

The method and system of the present invention offer significant advantages over conventional methods and systems by improving backup management by substantially removing the burden of full backups from networks and backup clients. Without the typical performance trade-off imposed by traditional level backup products, information technology professionals have more freedom to redesign their backup policies and procedures. The invention provides reduced lower network and backup client loads with increased reliability and potentially lower tape and storage device management costs. Using the merge method and system of this invention, sites can efficiently centralize backups over existing data networks and take advantage of high capacity tape drives.

While a specific embodiment of the invention has been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A method for providing a full backup of a client computer system, the client computer system having at least one storage disk, said method comprising:

providing a backup server;

determining whether said backup server includes a meta file for said at least one disk on the backup client, and if said backup server does not include a meta file for said at least one disk on the backup client, then requesting a full backup from the client system, receiving substantially all files from the client system, storing a substantially complete copy of the files on said backup server;

sending a time stamp from said backup server to the client system;

sending all files created or modified since a previous backup from the client system to said backup server;

requesting any additional files from the client system that have not already been stored on the backup server;

storing a substantially complete copy of the created or modified files on the backup server;

providing all files from a most recent backup in a cache within said backup server, said most recent backup having a first backup level;

locating a next most recent backup volume, said next most recent backup volume having a second backup level, said second backup level being lower than said first backup level;

if the next most recent backup volume is located, then comparing each file within said next most recent backup volume to said files within said cache, copying to said cache all files for which a later version of said file does not exist within said cache, but is referenced in said meta data for said most recent backup;

copying said cache onto a resulting backup volume, whereby said resulting backup volume having a backup level substantially equal to the second backup level is produced; and repeating said steps of locating a next most recent backup volume, comparing each file of said backup volume to said files within said cache, and copying said cache onto a resulting backup volume, until a desired backup level is reached.

2. The method according to claim 1, wherein an on-line database is produced for each new backup volume created.

3. The method of claim 1, wherein said resulting backup volume is substantially equivalent to a full backup volume.

4. The method of claim 1, wherein said resulting backup volume is substantially equivalent to a mid-level backup volume.

5. The method according to claim 1, wherein said steps of determining whether said backup server includes a meta file for said at least one disk on the backup client, and storing a substantially complete copy of the files on said backup server are performed substantially by said backup server.

6. The method according to claim 1, wherein each of said files includes a metadata header and a metadata footer.

7. A method for providing an incremental backup of a client computer system, the client computer system having at least one storage disk, said method comprising:

providing a backup server;

sending a time stamp from said backup server to the client system;

sending all files created or modified since a previous backup from said client system to said backup server;

requesting any additional files from the client system that have not already been stored on the backup server;

storing a substantially complete copy of the created or modified files on the backup server;

providing all files from a most recent backup in a cache within said backup server, said most recent backup having a first backup level;

locating a next most recent backup volume, said next most recent backup volume having a second backup level, said second backup level being lower than said first backup level;

if the next most recent backup volume is located, then comparing each file within said next most recent backup volume to said files within said cache, copying to said cache all files for which a later version of said file does not exist within said cache but is referenced in said cache meta data;

copying said cache onto a resulting backup volume, whereby said resulting backup volume having a backup level substantially equal to the second backup level is produced; and repeating said steps of locating a next most recent backup volume, comparing each file of said backup volume to said files within said cache, and copying said cache onto a resulting backup volume, until a desired backup level is reached.

8. The method according to claim 7, wherein an on-line database is produced for each new backup volume created.

9. The method according to claim 7, wherein said steps of sending a time stamp from said backup server to the client system, verifying that there are no additional files for which a backup is needed, and storing a substantially complete copy of the files on the backup server are performed substantially by said backup server.

10. The method of claim 7, wherein said resulting backup volume is substantially equivalent to a full backup volume.

11. The method of claim 7, wherein said resulting backup volume is substantially equivalent to a mid-level backup volume.

12. The method according to claim 7, wherein each of said files includes a metadata header and a metadata footer.

13. The method according to claim 7, wherein said step of verifying that there are no additional files for which a backup is needed further comprises checking metadata transmitted by the client system and checking records of a previous backup within said backup server.

14. A method for providing a merge backup of a client computer system, comprising:

providing a backup server;

providing all files from a most recent backup in a cache within said backup server, said most recent backup having a first backup level;

locating a next most recent backup volume, said next most recent backup volume having a second backup level, said second backup level being lower than said first backup level, if the next most recent backup volume is located, then comparing each file within said next most recent backup volume to said files within said cache, copying to said cache all files for which a later version of said file does not exist within said cache, but is referenced in said cache meta data;

copying said cache onto a resulting backup volume, whereby said resulting backup volume having a backup level substantially equal to the second backup level is produced; and repeating said steps of locating a next most recent backup volume, comparing each file of said backup volume to said files within said cache, and copying said cache onto a resulting backup volume, until a desired backup level is reached.

15. The method of claim 14, wherein said resulting backup volume is substantially equivalent to a full backup volume.

16. The method of claim 14, wherein said resulting backup volume is substantially equivalent to a mid-level backup volume.

17. The method of claim 14, wherein said method is performed substantially by said backup server.

18. The method according to claim 14, wherein each of said files includes a metadata header and a metadata footer.

19. The method according to claim 14, wherein an on-line database is produced for each new backup volume created.

20. The method according to claim 14, wherein a copy of the cache meta data is retained on-line each time the cache file stream is set to the empty cache file stream.

* * * * *